US011800367B2

(12) United States Patent
Taneja et al.

(10) Patent No.: US 11,800,367 B2
(45) Date of Patent: Oct. 24, 2023

(54) MANAGING RESOURCES IN CBRS NETWORKS

(71) Applicant: Cisco Technology, Inc., San Jose, CA (US)

(72) Inventors: Mukesh Taneja, Bangalore (IN); Indermeet Singh Gandhi, Bangalore (IN)

(73) Assignee: Cisco Technology, Inc., San Jose, CA (US)

( * ) Notice: Subject to any disclaimer, the term of this patent is extended or adjusted under 35 U.S.C. 154(b) by 22 days.

(21) Appl. No.: 17/511,297

(22) Filed: Oct. 26, 2021

(65) Prior Publication Data

US 2022/0053336 A1 Feb. 17, 2022

Related U.S. Application Data

(62) Division of application No. 16/584,029, filed on Sep. 26, 2019, now Pat. No. 11,202,206.

(51) Int. Cl.
*H04W 16/10* (2009.01)
*H04B 17/318* (2015.01)
(Continued)

(52) U.S. Cl.
CPC .......... *H04W 16/10* (2013.01); *H04B 17/318* (2015.01); *H04W 72/0453* (2013.01);
(Continued)

(58) Field of Classification Search
CPC ..... H04W 16/10; H04W 16/14; H04W 16/16; H04W 72/0433; H04W 72/0453;
(Continued)

(56) References Cited

U.S. PATENT DOCUMENTS

2016/0212624 A1 7/2016 Mueck et al.
2017/0295497 A1 10/2017 MacMullan et al.
(Continued)

FOREIGN PATENT DOCUMENTS

WO 2017065852 4/2017
WO 2018087663 5/2018
WO 2019125470 6/2019

OTHER PUBLICATIONS

International Search Report and Written Opinion from the International Searching Authority, dated Dec. 17, 2020, 11 pages, for corresponding International Patent Application No. PCT/US2020/050741.

*Primary Examiner* — Pao Sinkantarakorn
(74) *Attorney, Agent, or Firm* — Polsinelli

(57) ABSTRACT

Systems, methods, and computer-readable media for improving resource management in Citizens Broadband Radio Service (CBRS) networks include a Spectrum Access System (SAS) in coordination with one or more CBRS devices (CBSDs) and a Digital Network Architecture center (DNA-C). Resource allocation decisions can be based on one or more policies such as a priority, a preemption capability index and/or a preemption vulnerability index associated with the CBSDs. Resource allocation can also be based on inter-access point (AP) coordination between two or more CBSDs and comparative performance indicators of the two or more CBSDs. Managing interference between two or more groups of CBSDs can be based on the inter-AP coordination and group identifiers associated with the two or more groups. Bandwidth allocation can be modified to the two or more CBSDs and seamless transition can be implemented using timers.

18 Claims, 22 Drawing Sheets

(51) Int. Cl.
*H04W 72/0453* (2023.01)
*H04W 72/541* (2023.01)
*H04W 84/04* (2009.01)
*H04W 84/18* (2009.01)
*H04W 92/20* (2009.01)

(52) U.S. Cl.
CPC ........ *H04W 72/541* (2023.01); *H04W 84/045* (2013.01); *H04W 84/18* (2013.01); *H04W 92/20* (2013.01)

(58) Field of Classification Search
CPC ........... H04W 72/0473; H04W 72/541; H04W 84/045; H04W 84/18; H04W 92/20
See application file for complete search history.

(56) References Cited

U.S. PATENT DOCUMENTS

| | | |
|---|---|---|
| 2018/0063844 A1 | 3/2018 | Khoshnevisan et al. |
| 2018/0132111 A1 | 5/2018 | Mueck et al. |
| 2018/0376342 A1 | 12/2018 | Macmullan et al. |
| 2019/0174359 A1* | 6/2019 | Hannan ................. H04W 72/53 |
| 2019/0222339 A1* | 7/2019 | Badic .................... H04W 16/14 |
| 2019/0364435 A1 | 11/2019 | Ahmavaara |
| 2020/0092731 A1 | 3/2020 | Beck et al. |
| 2020/0107210 A1 | 4/2020 | Wu et al. |
| 2021/0211889 A1* | 7/2021 | Buddhikot ............ H04W 72/51 |
| 2021/0352505 A1* | 11/2021 | Sevindik ............... H04W 24/02 |
| 2022/0303782 A1* | 9/2022 | Litjens ................. H04W 16/14 |

* cited by examiner

1900

```
EVALUATE AVAILABLE RESOURCES IN THE ONE OR MORE CBRS NETWORKS, THE
RESOURCES COMPRISING AT LEAST ONE OR MORE CHANNELS OF THE CBRS
SPECTRUM AVAILABLE TO ONE OR MORE CBRS DEVICES (CBSDs) OF THE ONE OR
MORE CBRS NETWORKS
1902
```

```
RECEIVE ONE OR MORE POLICIES ASSOCIATED WITH THE ONE CBSDs, WHEREIN A
POLICY OF A CBSD COMPRISES ONE OR MORE OF A PRIORITY, A PRE-EMPTION
CAPABILITY INDEX OR A PRE-EMPTION VULNERABILITY INDEX ASSOCIATED WITH
THE CBSD
1904
```

```
DETERMINE ONE OR MORE PARAMETERS ASSOCIATED WITH THE ONE OR MORE
CBSDs BASED ON THE AVAILABLE RESOURCES AND THE ONE OR MORE POLICIES,
WHEREIN A PARAMETER ASSOCIATED WITH THE CBSD COMPRISES AT LEAST A
FREQUENCY RANGE IN THE ONE OR MORE CHANNELS AND A MAXIMUM TRANSMIT
EFFECTIVE IOSOTROPIC RADIATED POWER (EIRP)
1906
```

RECEIVE ONE OR MORE POLICIES ASSOCIATED WITH A CBRS DEVICE (CBSD), FROM A DIGITAL NETWORK ARCHITECTURE CENTER (DNA-C), WHEREIN A POLICY OF THE CBSD COMPRISES ONE OR MORE OF A PRIORITY, A PRE-EMPTION CAPABILITY INDEX AND A PRE-EMPTION VULNERABILITY INDEX ASSOCIATED WITH THE CBSD
2002

DETERMINE RESOURCE REQUIREMENTS OF ONE OR MORE CBRS USER EQUIPMENT (UEs) MANAGED BY THE CBSD
2004

PROVIDE THE ONE OR MORE POLICIES AND THE RESOURCE REQUIREMENTS TO A SPECTRUM ACCESS SYSTEM (SAS)
2006

FIG. 20

MANAGING RESOURCES IN CBRS NETWORKS

CROSS-REFERENCE TO RELATED APPLICATION

This application is a division of U.S. Non-Provisional patent application Ser. No. 16/584,029, filed on Sep. 26, 2019, the full disclosure of which is hereby expressly incorporated by reference in its entirety.

TECHNICAL FIELD

The present technology pertains to enterprise networks, and more specifically to managing resources in one or more enterprise networks utilizing a Citizens Broadband Radio Service (CBRS) spectrum.

BACKGROUND

The Citizen Broadcast Radio Service (CBRS) is a 150 MHz wide spectrum in the 3550-3700 MHz frequency range in the United States. Some of this spectrum is used by the United States government for their radar systems. When portions of the spectrum are not in use, those portions can be made available for use by other entities. The Federal Communications Commission (FCC) created rules for commercial use of the CBRS spectrum. Enterprises can use this CBRS spectrum to set up private Long-term Evolution (LTE) networks and allow access to consumer and Internet of Things (IoT) devices. Enterprises may expand and increase the coverage density of private LTE networks by integrating CBRS into their wireless connectivity services. CBRS style shared spectrum in some other bands is also being planned in Europe and some other parts of the world.

The CBRS spectrum use is governed by a three-tiered spectrum authorization framework (incumbent access, priority access, general authorized access) to accommodate a variety of commercial uses on a shared basis with incumbent federal and non-federal users of the band. Incumbent access users include authorized federal and grandfathered fixed satellite service users. Priority access consists of priority access licenses assigned to competitive bidding within the band. Lastly, general authorized access is licensed-by-rule to permit open, flexible access to any portion of the band not assigned to any of the two higher tiers with respect to the widest possible group of potential users. The access and operations for the band across the three different tiers can be managed by a dynamic spectrum access system (SAS).

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIG. 19 illustrates a flow chart of an example processes for managing resources of one or more CBRS networks by a Spectrum Access System (SAS), according to example aspects of this disclosure;

FIG. 20 illustrates a flow chart of an example processes for managing resources of one or more CBRS networks by a CBSD, according to example aspects of this disclosure;

DETAILED DESCRIPTION

Figure 1:
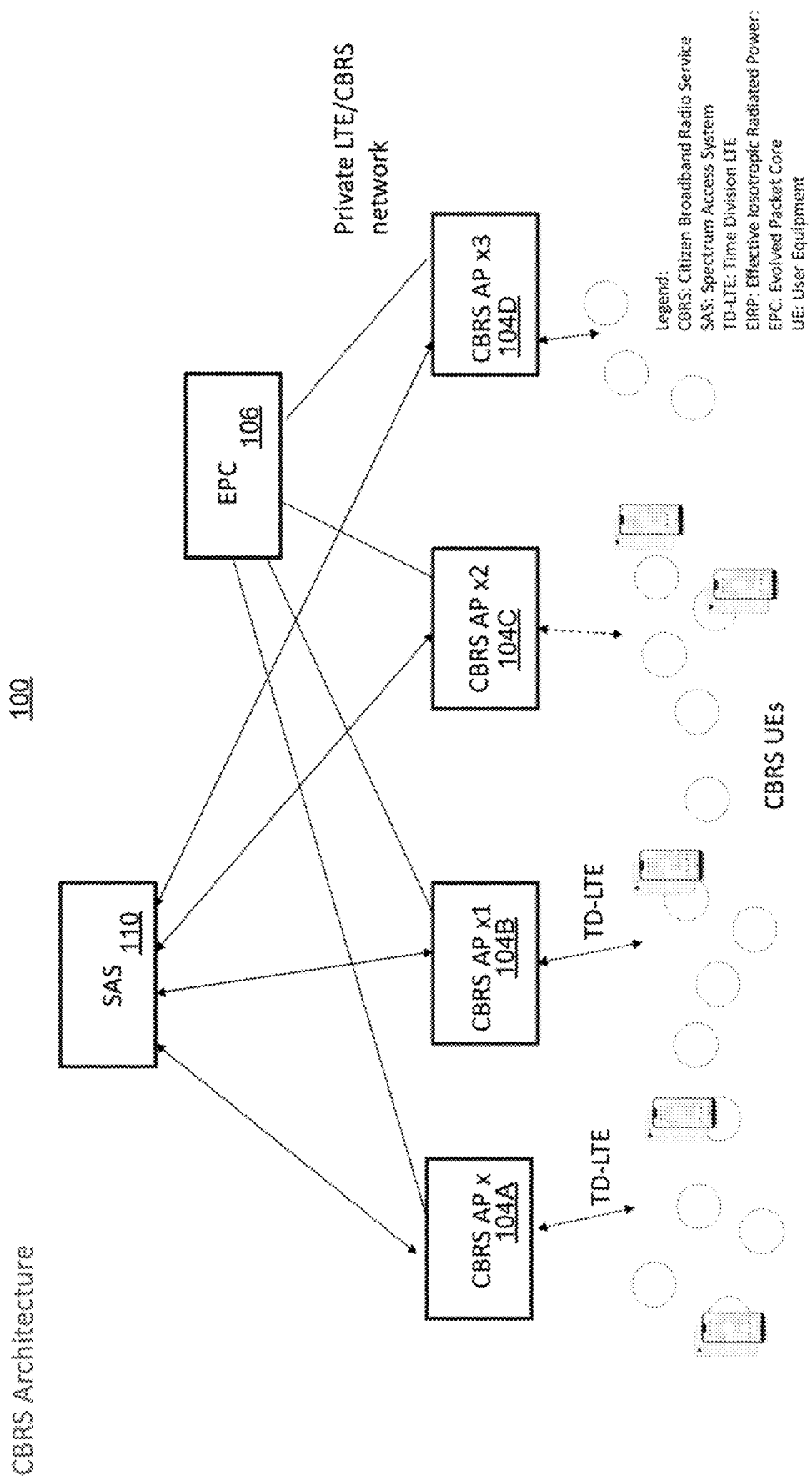
FIG. 1 illustrates a CBRS network architecture, according to some implementations.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any example term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

OVERVIEW

Disclosed herein are systems, methods, and computer-readable media for improving the resource management in CBRS networks. In various examples, a Spectrum Access System (SAS), possibly in coordination with one or more CBRS access points (APs) (also referred to as CBRS devices (CBSDs)), one or more CBRS user equipment (UEs) and/or a Digital Network Architecture center (DNA-C) can manage resource allocation, conflict resolution, traffic prioritization, etc., of one or more CBSDs in one or more CBRS networks. In some examples, the resource allocation decisions can be based on policies such as a priority, a preemption capability index and/or a preemption vulnerability index associated with the CBSDs and/or CBRS UEs. In some examples, allocating resources to two or more CBSDs can be based on inter-AP coordination between two or more CBSDs. In some examples, allocating resources to the two or more CBSDs can be based on comparative performance indicators of the two or more CBSDs. In some examples, managing interference between two or more groups of CBSDs can be based on parameters associated with the two or more groups. In some examples, bandwidth can be dynamically allocated to the two or more CBSDs based on timers associated with the two or more CBSDs. In some examples, resolving conflicts between two or more CBSDs can be based on parameters such as Physical Cell Identifiers (PCIs) associated with the two or more CBSDs.

In some examples, a method of managing resources of one or more Citizens Broadband Radio Service (CBRS) networks by a Spectrum Access System (SAS) is provided. The method includes evaluating available resources in the one or more CBRS networks, the resources comprising at least one or more channels of the CBRS spectrum available to one or more CBRS devices (CBSDs) of the one or more CBRS networks, receiving one or more policies associated with the one or more CBSDs, wherein a policy of a CBSD comprises one or more of a priority, a pre-emption capability index or a pre-emption vulnerability index associated with the CBSD; and determining one or more parameters associated with the one or more CBSDs based on the available resources and the one or more policies, wherein a parameter associated with the CBSD comprises at least a frequency range in the one or more channels and a maximum transmit Effective Isotropic Radiated Power (EIRP).

Some examples further include receiving the one or more policies from the one or more CBSDs, and providing the one or more parameters to the one or more CBSDs.

Some examples further include receiving one or more inter-access point (AP) coordination capabilities associated with the one or more CBSDs; determining performance modifications based on the inter-AP coordination capabilities; and modifying resource allocations to the one or more CBSDs based on the performance modifications.

Some examples further include determining at least one new channel for at least one CBSD based on the performance modifications.

Some examples further include determining a time interval for a seamless transition from a current channel to the new channel for the at least one CBSD and providing the time interval and one or more associated time instances to the at least one CBSD.

Some examples further include obtaining one or more physical cell identifiers (PCIs) associated with one or more groups of the CBSDs; determining one or more resource conflicts between the one or more groups; and determining one or more modifications to the resource allocations to resolve the one or more conflicts based on the one or more PCIs and the inter-AP coordination capabilities.

In some examples, the SAS is associated with at least a first enterprise, and the method of managing resources further comprises communicating with at least a second SAS of a second enterprise, wherein the one or more groups belong to one or more of the first enterprise or the second enterprise.

In some examples, the one or more enterprises further comprise one or more Self-Organizing Networks (SONs).

Some examples further include obtaining one or more comparative performance indicators from the one or more CBSDs; and determining whether there are performance anomalies for the one or more CBSDs based on the one or more comparative performance indicators.

In some examples, managing the resources of the one or more CBRS networks further comprises communicating with a Digital Network Architecture Center (DNA-C).

In some examples, a method of managing resources of one or more Citizens Broadband Radio Service (CBRS) networks by a CBRS device (CBSD) is provided. The method includes receiving one or more policies associated with the CBSD, from a Digital Network Architecture Center (DNA-C), wherein a policy of the CBSD comprises one or more of a priority, a pre-emption capability index and a pre-emption vulnerability index associated with the CBSD; determining resource requirements of one or more CBRS user equipment (UEs) managed by the CBSD, and providing the one or more policies and the resource requirements to a Spectrum Access System (SAS).

Some examples further include determining one or more inter-AP coordination capabilities for coordinating with one or more neighboring CBSDs; and providing the one or more inter-AP coordination capabilities to the SAS.

Some examples further include determining one or more physical cell identifiers (PCIs) of one or more cells associated with the CBSD and one or more neighboring CBSDs; and providing the one or more PCIs to the SAS.

Some examples further include receiving one or more parameters from the SAS, the one or more parameters comprising at least a frequency range for one or more channels and maximum transmit Effective Isotropic Radiated Power (EIRP); and determining resources for the one or more CBRS UEs based on the one or more parameters.

In some examples, a system for managing resources of one or more Citizens Broadband Radio Service (CBRS) networks is provided. The system comprises one or more processors; and a non-transitory computer-readable storage medium containing instructions which, when executed on the one or more processors, cause the one or more processors to perform operations. The operations include evaluating available resources in the one or more CBRS networks, the resources comprising at least one or more channels of the CBRS spectrum available to one or more CBRS devices (CBSDs) of the one or more CBRS networks; receiving one or more policies associated with the one or more CBSDs, wherein a policy of a CBSD comprises one or more of a priority, a pre-emption capability index and a pre-emption vulnerability index associated with the CBSD; and determining one or more parameters associated with the one or more CBSDs based on the available resources and the one or more policies, wherein a parameter associated with the CBSD comprises at least a frequency range in the one or more channels and a maximum transmit Effective Isotropic Radiated Power (EIRP).

In some examples, the operations comprise receiving the one or more policies from the one or more CBSDs and providing the one or more parameters to the one or more CBSDs.

In some examples, the operations further comprise receiving one or more inter-access point (AP) coordination capabilities associated with the one or more CBSDs; determining performance modifications based on the inter-AP coordination capabilities; and modifying resource allocations to the one or more CBSDs based on the performance modifications.

In some examples, the operations further comprise determining at least one new channel for at least one CBSD based on the performance modifications.

In some examples, the operations further comprise determining a time interval for a seamless transition from a current channel to the new channel for the at least one CBSD and providing the time interval and one or more associated time instances to the at least one CBSD.

In some examples, the operations further comprise obtaining one or more physical cell identifiers (PCIs) associated with one or more groups of the CBSDs; determining one or more resource conflicts between the one or more groups; and determining one or more modifications to the resource allocations to resolve the one or more conflicts based on the one or more PCIs and the inter-AP coordination capabilities.

The examples in this overview are not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim. The foregoing, together with other features and embodiments, will become more apparent upon referring to the following specification, claims, and accompanying drawings.

DESCRIPTION OF EXAMPLE EMBODIMENTS

The disclosed technologies address the need in the art for managing resources among two or more CBRS networks, for example, in dense environments where spectrum allocation may overlap and interference may be possible among the two or more CBRS networks. As previously mentioned a dynamic spectrum access system (SAS) may manage access and operations of the CBRS spectrum across the various tiers of CBRS spectrum users. The conventional deployments of the SAS management are not suitable in some situations. For example, the conventional SAS implementations are not capable of managing resources appropriately in dense networks with multiple CBRS networks which may have possible geographical overlap, bandwidth usage overlap, interference, etc. For example, in conventional implementations, the resource management decisions performed by the SAS are not seen to effectively account for various factors that may impact performance in dense deployments.

Example aspects of this disclosure are directed to improving the resource management in CBRS networks according to one or more techniques. In various examples, the SAS, possibly in coordination with one or more CBRS devices (CBSDs) and/or a Digital Network Architecture center (DNA-C) can manage traffic decisions for two or more CBSDs in two or more CBRS networks based a priority, a preemption capability index and/or a preemption vulnerability index associated with each CBSD. In some examples, allocating resources to two or more CBSDs can be based on coordination between the two or more CBSDs. In some examples, allocating resources to the two or more CBSDs can be based on comparative performance indicators of the two or more CBSDs. In some examples, managing interference between two or more groups of CBSDs can be based on parameters associated with the two or more groups. In some examples, bandwidth can be dynamically allocated to the two or more CBSDs based on timers associated with the two or more CBSDs. In some examples, resolving conflicts between two or more CBSDs can be based on parameters such as physical cell identifiers (PCIs) associated with the two or more CBSDs.

FIG. 1 illustrates an example deployment of a CBRS network 100. In the CBRS network 100, the CBRS spectrum can be used with 4G LTE-Time Division Duplex technology to support private LTE networks. Similar to LTE networks, the CBRS network 100 can include an eNodeB, Core Network for Packet services and IMS for voice and multimedia services. In addition to the traditional LTE networks, the CBRS network 100 can include an additional node shown as a Spectrum Access System (SAS) 110 to manage and control access to the CBRS network 100. The SAS 110 can be implemented using a three-tier spectrum authorization framework to accommodate a variety of commercial uses on a shared basis with incumbent federal and non-federal users of the CBRS band.

The CBRS network 100 can be accessed by one or more UEs 102, identified as CBRS UEs. The UEs 102 can include various computing and networking devices such as mobile devices, laptops, desktops, etc. One or more access points, identified as CBRS APs 104A-D, for example, can control and provide network access to the UEs 102. As previously mentioned, the CBRS APs 104A-D may also be referred to as CBRS devices (CBSDs). The CBRS APs 104A-D can belong to different networks or enterprises, e.g., a private LTE network, and may communicate directly with UEs 102 of that network. The CBRS APs 104A-D, configured to support the CBRS band can be categorized into two types: CBSD-Category A and CBSD-Category B.

The SAS 110 can manage the three-tier license structure for the following types of access. A first access license referred to as an Incumbent Access (IA) is an access license used by the US Navy and also for fixed satellite services (FSS). The IA access has absolute priority over other type of allocation.

A second access license referred to as a Priority Access License (PAL) is an access license which can be used by hospitals, utilities and government departments as well as non-critical users such as mobile network operators (MNOs) (it is noted that operations of an enterprise may not be interrupted for using the PAL to perform critical operations). The PAL is assigned using competitive bidding to various enterprises and commercial users within the 3550-3650 MHz frequency block of the CBRS spectrum. Each access license under the PAL is defined as a non-renewable authorization to use a 10 megahertz channel in a single census tract (e.g., in a contained location or small geographic area/district) for a fixed period, e.g., three years. Up to seven total PALs may be assigned in any given census tract with up to four PALs being granted to any single applicant. Applicants may acquire up to two consecutive PAL terms in any given license area during the first auction.

A third access license referred to as a General Authorized Access (GAA) is provided to users can potentially have access to all 150 megahertz in the 3550-3700 MHz spectrum. GAA users are permitted to use any portion of the 3550-3700 MHz band not assigned to a higher tier user and may also operate opportunistically on unused Priority Access channels (it is also noted that operations of an enterprise may not be interrupted for using the GAA to perform critical operations).

The SAS 110 can control operation of the CBRS APs 104A-D based on the three-tiered licensing model. In some examples the SAS 110 can inform the CBRS APs 104A-D of frequency bands or channels to use in the CBRS spectrum and transmit/receive powers for any specific time or time period. An interface between the SAS 110 and the CBRS APs 104A-D can be based on the HTTP over Transport Layer Security (HTTP-TSL) protocol. The interface can include exchanges of messages for the following operations: a CBSD Registration Request/Response, a Spectrum Inquiry Request/Response, a Grant Request/Response, and a Heartbeat Request/Response.

When the CBRS APs 104A-D get powered on, they start the SAS-CBSD registration procedure with the SAS 110 to gain access to the CBRS spectrum. For example, the CBRS APs 104A-D send their respective Registration Requests (along with other parameters required by the SAS 110). After a Registration Response from the SAS 110 indicating a successful registration, the CBRS APs 104A-D perform the Spectrum Inquiry for the available channel information from the CBRS spectrum. Upon receiving a Spectrum Inquiry Response to the Spectrum Inquiry, the CBRS APs 104A-D send a Grant Request with one of the operating channels and peak power indicated in the Spectrum Inquiry Response. The Spectrum Inquiry is an optional procedure. In case of an Spectrum Inquiry failure, the CBRS APs 104A-D can continue with a grant procedure. In response to the Grant Request, the CBRS APs 104A-D gain approval for the requested frequency channel and the max EIRP (which influences the max transmit power of CBRS AP). The CBRS APs 104A-D may also receive time period for the grant. Once the CBRS APs 104A-D reach the granted state, they initiate a heartbeat procedure and receive authorization from the SAS 110 for RF transmission.

The CBRS APs 104A-D can be provide corresponding access rules and policies to the UEs 102 for accessing the CBRS network 100 (or portion thereof) through respective CBRS APs 104A-D, where these rules and policies can include a frequency channel which has been allocated to the CBRS APs 104A-D, and according to example aspects, access permissions and priorities.

An evolved packet core (EPC) 106 can also be deployed within the CBRS network 100. The EPC 106 can provide a variety of different functions for the CBRS network 100. For example, the EPC 140 can manage session states, authenticate, and manage communication associated with access points and/or user equipment within the CBRS network 100. The EPC 106 can also be used to route communications (e.g., data packets), manage quality of service (QoS), and provide deep packet inspection (DPI) functionality within the CBRS network.

Figure 2:
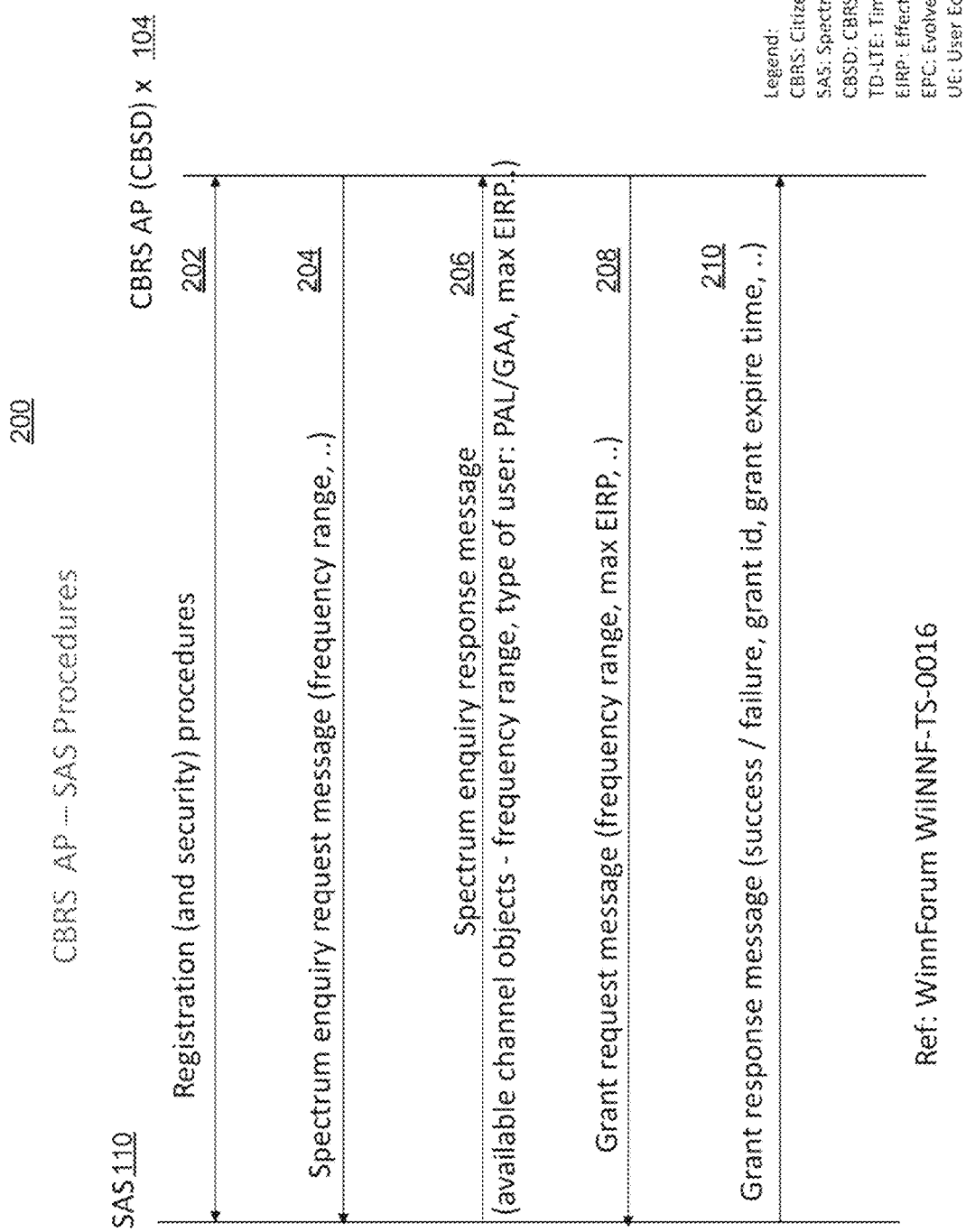
FIG. 2 illustrates a flow chart of message exchanges in a CBRS network, according to example aspects of this disclosure.

FIG. 2 illustrates a flow diagram 200 showing the interactions of the SAS 110 with a CBSD such as any of the CBRS APs 104A-D (collectively referred to as a CBRS AP 104). In particular, the flow diagram illustrates the interactions between the SAS 110 and the CBRS AP 104 associated with establishing how the CBRS AP 104 would operate within the overall CBRS network 100 as illustrated in FIG. 1. In step 202, registration and security procedures are performed. The registration and security procedures may be used to identify the type of user (e.g., a CBRS AP or CBSD) and what tier they are associated with. For example, the identification may pertain to users of tiers 2-3 including PAL and GAA devices. In step 204, the CBRS AP 104 can send a spectrum enquiry request to the SAS 110. For example, CBRS AP 104 send a request which can include preferences regarding the frequency range or CBRS channel (e.g., channel ID and associated frequency) and maximum effective isotropic radiated power (EIRP) that the CBRS AP 104 may wish to use for that channel, to determine whether the preferred frequency range and maximum EIRP are available to use. The SAS 110 can then check to see if the resources associated with the preferences in the request from the CBRS AP 104 are available.

In step 206, the SAS 110 can provide a spectrum enquiry response that includes information responsive to the spectrum enquiry request sent by the CBRS AP 104 in step 204. For example, the SAS 110 (after reviewing the available information about other access points and what portions of the CBRS band are currently in use) can provide available channels for the type of user (GAA/PAL) pertaining to the CBRS AP 104. Further, the spectrum enquiry response from the SAS 110 can also include constraints on the CBRS AP 104 in connection with the available CBRS channels (e.g., restrictions on frequency, maximum effective isotropic radiated power (EIRP), etc.).

In step 208, the CBRS AP 104 can send a grant request message to the SAS 110, which includes a request for grant of parameters such as CBRS channels, maximum EIRP, etc., selected from the available CBRS channels indicated by the SAS 110 in step 206. The SAS 110 can then provide a grant response in step 210 indicating whether the requested parameters can be granted (success) or not (failure), based on the available resources that the SAS 110 can assign to the CBRS AP 104. Further, the SAS 110 can provide additional information in step 210 to the CBRS AP 104 which can include an expiration time or a duration for which the granted parameters would be available.

With the above deployment of network 100 and the corresponding flow diagram 200 that the SAS 110 can use for assigning the different CBRS channels and operational parameters to the CBRS APs 104, some issues may arise with respect to interference between various CBRS networks and CBSDs, e.g., in dense environments such as multi-tenant buildings where access points and/or user equipment may operate in overlapping channels (or transmit at a power that may cause interference with other devices in a neighboring building). In some examples, different SAS (e.g., belonging to different SAS providers) can assign different nearby enterprises to the same CBRS channels. It is also possible that such overlapping or interfering assignments can occur within the same SAS as well (e.g. for GAA users that are not protected by SAS). Transmission from user equipment or CBSDs can also cause interference to neighboring devices operating in the same CBRS channel.

Because an enterprise may not know how the SAS may assign what portion of the CBRS spectrum to use, this also causes problems on the side of the enterprise trying to do proper network planning. The network planning may not be possible as enterprises would not have any idea about what part of the CBRS spectrum (and associated parameters such as maximum effective isotropic radiated power that a CBSD can use while transmitting data) that the enterprise (and its access points) may be assigned at any given time. An improvement to the CBRS network 100 will be described next.

Figure 3:
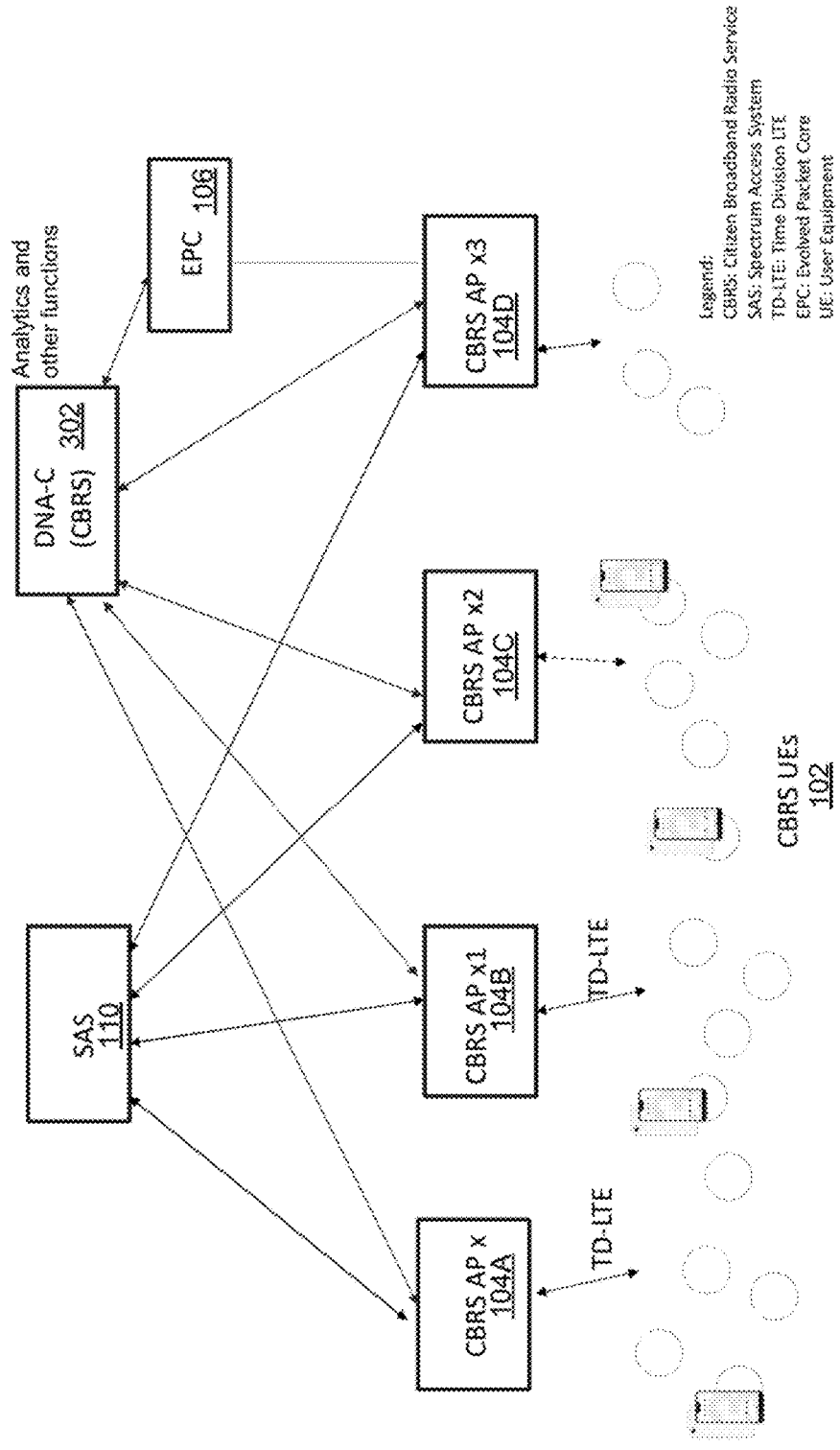
FIG. 3 illustrates a CBRS network architecture with a Digital Network Architecture center (DNA-C), according to some implementations.

FIG. 3 illustrates a deployment of the CBRS network 300, which includes a digital network architecture center (DNA-C) 302 in addition to the aspects described with reference to the CBRS network 100 of FIG. 1. The DNA-C 302 can be configured to aid the CBRS APs 104A-D in addition to the SAS 110. For example, the DNA-C 108 can obtain the assignments of each of the CBRS APs 104A-D provided by the SAS 110. In some examples, the DNA-C 108 can monitor performance of the CBRS APs 104A-D and associated UEs 102 to detect when interference is present. In some examples, the DNA-C 108 can determine different parameters to assign to one or more of the CBRS APs 104A-D when interference is detected, and dynamically re-assign the operational parameters of the CBRS APs 104A-D to minimize and/or eliminate the detected interference. In some examples, the DNA-C 108 can determine different parameters to assign to one or more of the CBRS APs 104A-D when interference is detected, communicate this recommendation to the SAS 110 (e.g., via the CBRS APs 104A-D) and enable the SAS 110 to determine whether and how to minimize and/or eliminate the detected interference. In this way, the DNA-C 310 can resolve issues of interference between the CBRS APs 104A-D and/or the UEs 202 that the SAS 110 may not be able to account for.

Figure 4:
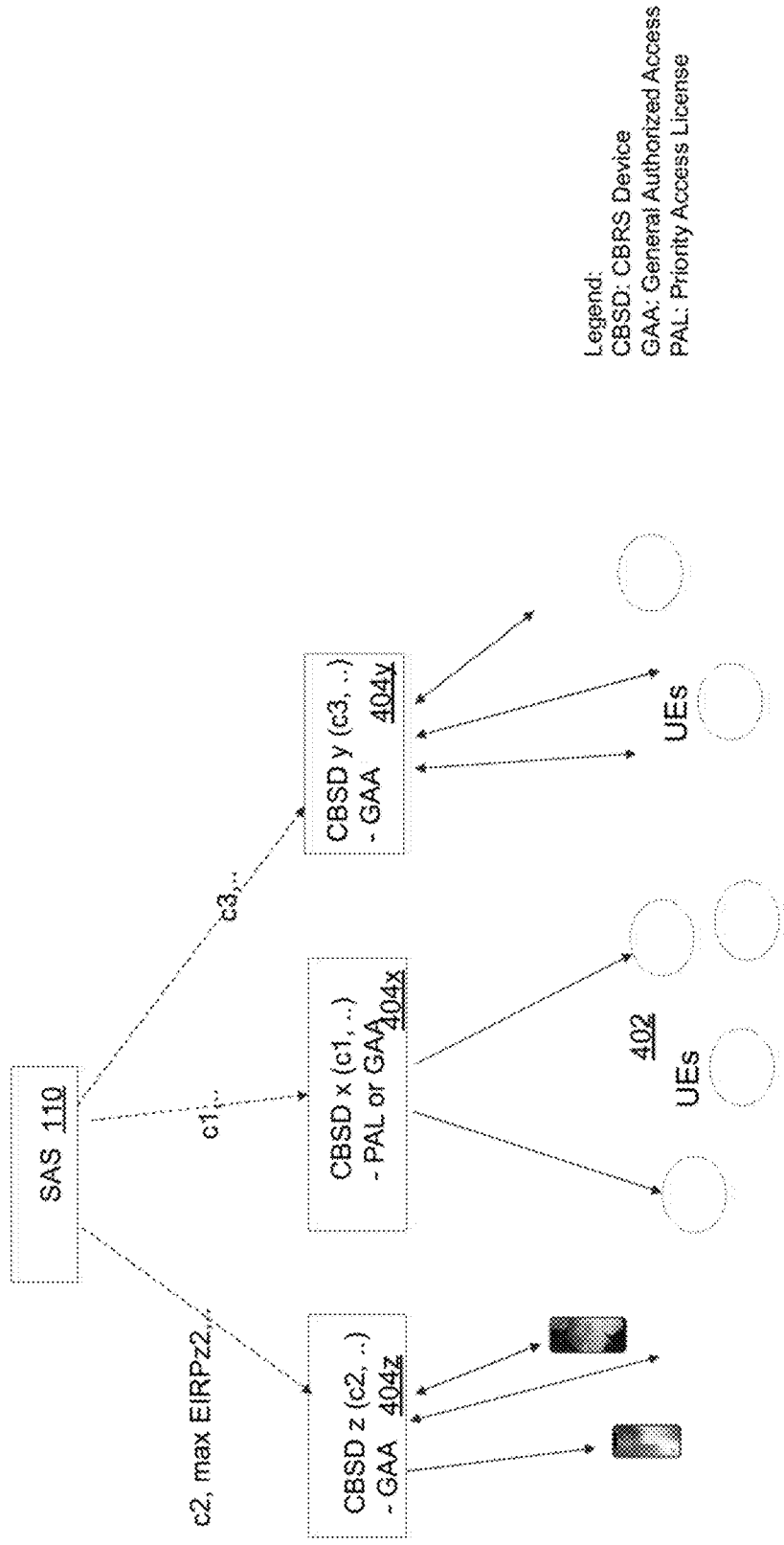
FIG. 4 illustrates a CBRS network in dense deployment scenarios, according to some implementations.

FIG. 4 is a diagram of a CBRS network 400 which illustrates a dense scenario. In the CBRS network 400, the SAS 110 can control operation of the CBRS APs 404*x*, 404*y*, and 404*z*. The CBRS APs 404*x-z* can include PAL or GAA devices for managing access to the various UEs 402. The CBSDs of the network 400 including the various CBRS APs 404*x-z* and the UEs 402 can be located in a dense environment where there may be potential overlap and interference. For example, the SAS 110 can grant the parameters such as the CBRS channel or frequency range, maximum EIRP, etc., to the different CBRS APs 404*x-z* based on the flow diagram 200 discussed with reference to FIG. 2, for example. However, subsequent to the grant, if one of the CBRS APs 404*x-z*, say CBRS AP 404*x* requests additional resources such as channel bandwidth, then the SAS 110 may be tasked with deciding whether to reallocate some of the resources from one or more of the other remaining CBRS APs 404*y* and 404*z* due to the limited bandwidth availability in such dense environments. There may be additional modifications such as channel changes which may need to be made to the grants provided to the CBRS APs 404*y* and 404*z* to enable the SAS 110 to grant the request for additional resources from the CBRS AP 404*x*. However, there are no specific policies or provisions in existing CBRS networks to guide the SAS 110 in making such decisions.

Further, some of the CBRS APs 404*x-z*, such as the CBRS AP 404*x* requesting additional resources, may be carrying high priority traffic (e.g., from respective UEs 402 which can include sensors in an enterprise or video surveillance data) while some the remaining CBRS APs 404*y* and 404*z* may be servicing lower priority applications/traffic. The current CBRS network deployments also lack mechanisms for guiding the SAS 110 to make such resource allocation decisions which take into account priority levels associated with the various CBSDs of the network 400.

Figure 5:
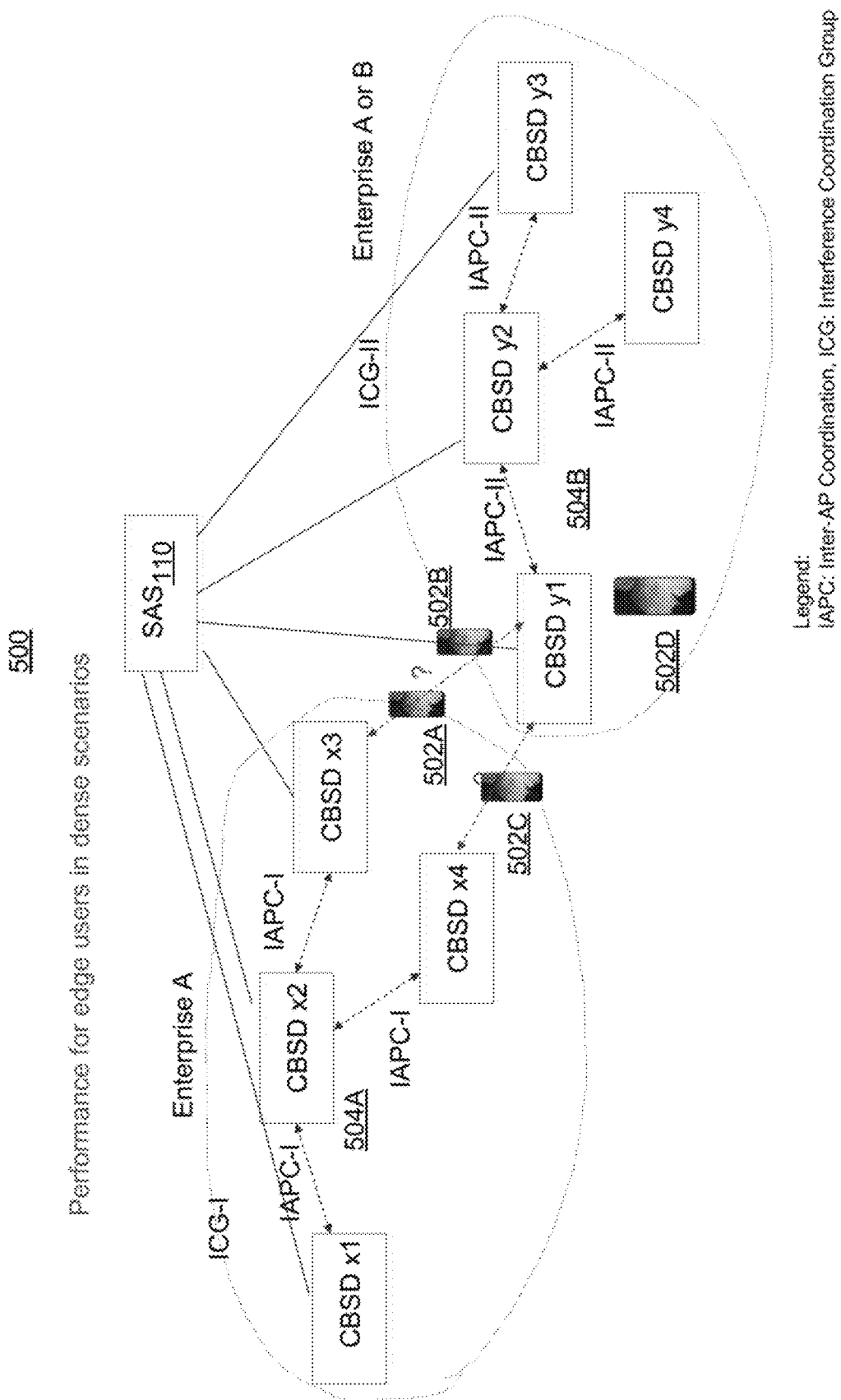
FIG. 5 illustrates a CBRS network with edge users shown in dense deployment scenarios, according to some implementations.

FIG. 5 is a diagram of a CBRS network 500 which illustrates another dense scenario. In the CBRS network 500, the SAS 110 can control operation of different groups 504A and 504B of CBSDs. The groups 504A and 504B can pertain to different enterprises or a combination of one or more enterprises, such as enterprises A and B. As seen, there can be overlap (either geographically or within interfering network domains). Some UEs 502A-C are specifically identified as being on edges of different groups or domains to illustrate the potential overlap. For such edge users, the overlap may be the highest and most problematic.

In conventional implementations, the SAS 110 may be aware of the group IDs inter-coordination groups, but not aware of coordination capabilities between different CBSDs. For example, some of the CBSDs in the groups 504A and 504B can include CBRS APs which are capable of coordinating amongst each other to manage such interference users within the groups using inter-AP coordination techniques.

Various types of inter-AP coordination techniques are known in the art. For example, in both uplink and downlink directions, Coordinated Multipoint Transmission (CoMP) techniques can be used, which can include coordinated scheduling and beam forming as well as joint transmission (downlink) and joint reception (uplink). When the APs belong to different cells, Inter-Cell Interference Coordination (ICIC) and enhanced Inter-Cell Interference Coordination (eICIC) are also possible.

However, such inter-AP coordination techniques may not be possible across enterprises, for example. So in the dense scenario with various edge users, the CBSDs in group 504A may not be capable of coordinating with the CBSDs in the group 504B to mitigate the interference for the edge users 502A-D. The SAS 110 may be aware of the locations of the CBSDs and also manage resource allocation for the various CBRS APs, but since the conventional SAS 110 is not aware of inter-AP coordination techniques, the SAS 110 in the network 500 may also be unable to provide any assistance in managing the overlap and interference.

Figure 6:
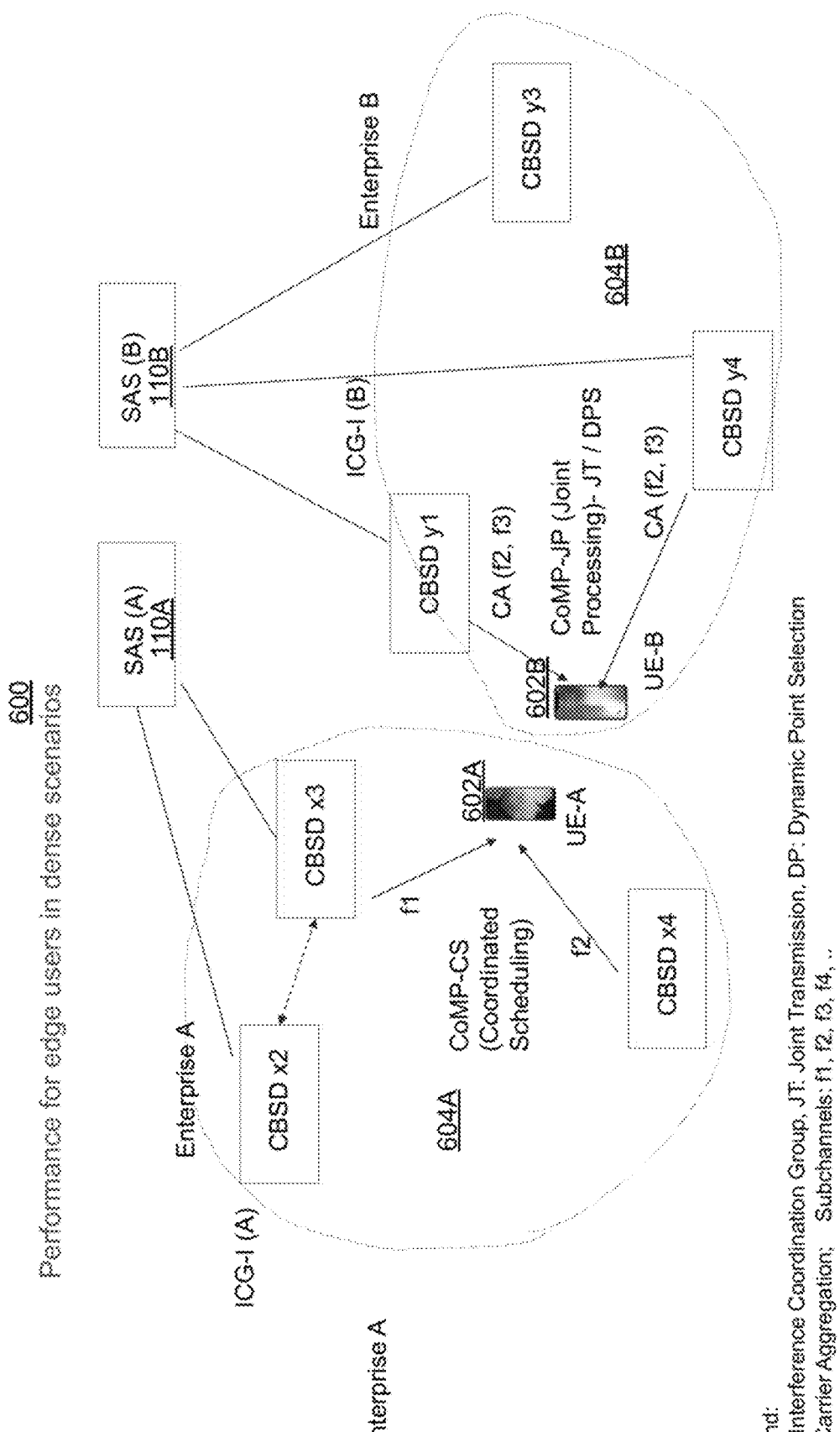
FIG. 6 illustrates a CBRS network with edge users shown in dense deployment scenarios, according to some implementations.

FIG. 6 is a diagram of a CBRS network 600 which illustrates another problem of managing edge users in dense scenarios. In the CBRS network 600, different SAS, such as SAS 110A and 110B can be provided for managing respective CBSD groups 604A and 604B belonging to enterprises A and B. Within the enterprise A, the CBSDs x3 and x4 of group 604A, for example, can adopt Coordinated Multipoint Transmission (CoMP) coordinated scheduling techniques for managing CBRS sub channels f1 and f2 for communicating with the same UE 602A. Similarly, within the enterprise A, the CBSDs y1 and y4 of group 604B, for example, can adopt CoMP joint processing techniques for carrier aggregation (CA) of frequency sub channels (f2,f3) for communicating with the same UE 602B. However, the respective SAS 110A and 110B may be unaware of the inter-group coordination within the groups 604A and 604B. The SAS 110A and 110B may also be unable to communicate or coordinate within one another because they belong to different enterprise A and B. Therefore, for the UEs 602A and 602B which may be edge devices, there may be interference among the different sub channels f1-f3 despite the CoMP efforts within the CBSD groups.

Figure 7:
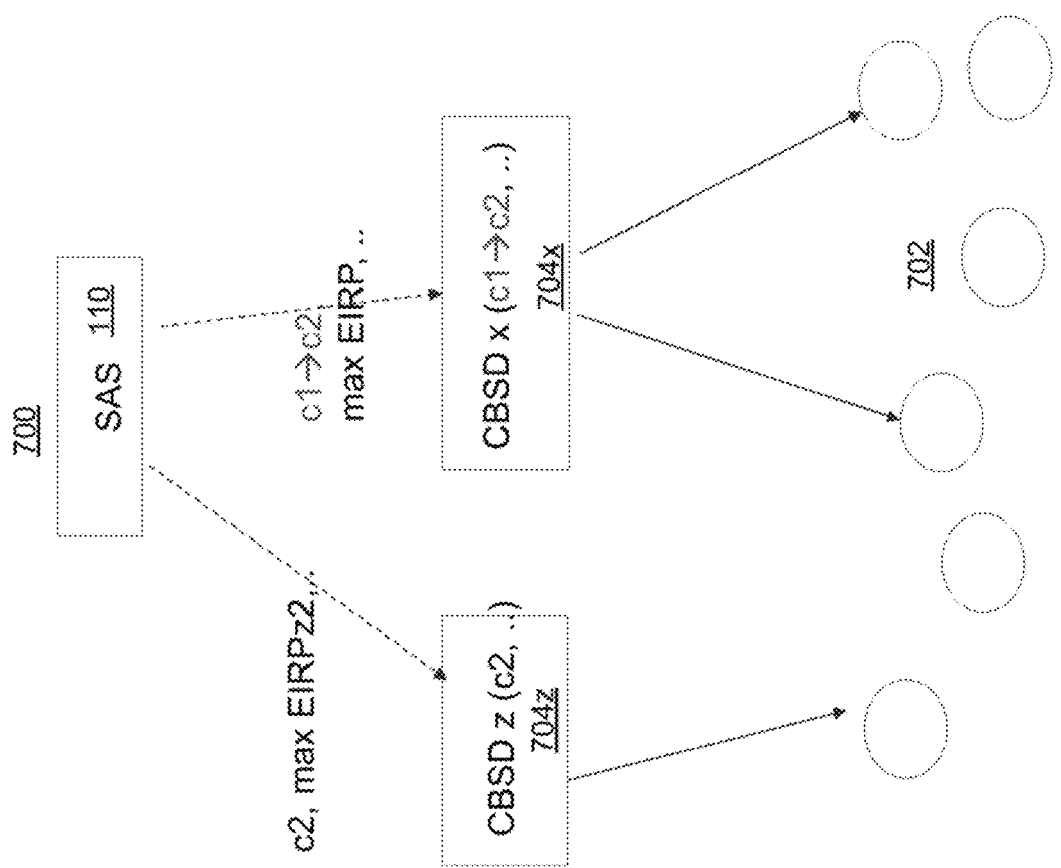
FIG. 7 illustrates a CBRS network with channel transition for some CBRS devices (CBSDs) shown in dense deployment scenarios, according to some implementations.

FIG. 7 is a diagram of a CBRS network 700 which illustrates channel transitions in dense scenario. In the CBRS network 700, the SAS 110 can control operation of different CBSDs such as CBRS APs 704$x$ and 704$z$. The SAS 110 may allocate resources such as channels and max EIRP to the CBRS APs 704$x$ and 704$z$, e.g., based on the flow diagram 200 of FIG. 2. For example, the CBRS AP 704$z$ may be allocated channel c2 and the CBRS AP 704$x$ may be allocated channel c1. However, if the CBRS AP 704$x$ requests a channel change, e.g., from c1 to c2, since both are available for allocating by the SAS 110, then transitioning the CBRS AP 704$x$ from the allocated channel c1 to the new channel c2 may be challenging, e.g., in dense scenarios.

For example, the channel bandwidths for the two channels c1 and c2 may be different, so transitioning the CBRS AP 704$x$ from c1 to c2, while the channel c2 is also allocated to the CBRS AP 704$z$ would increase the demand and burden on the channel c2. This may lead to degrading application performance of UEs 702 under the CBRS APs 704$x$ and 704$z$. For example, an application on a UE under the CBRS AP 704$z$ with demands on high reliability, low latency requirements may suffer from degrading performance if the channel c2 is now shared with UEs of the CBRS AP 704$x$. For example, video streaming or file transfer applications may also similarly suffer due to bandwidth reductions on the channels. The performance degradations may be emphasized when there is interference for edge users in dense scenarios. Existing CBRS deployments do not include seamless transition capabilities between channels for end devices (or UEs 702) or applications on these end devices.

Figure 8:
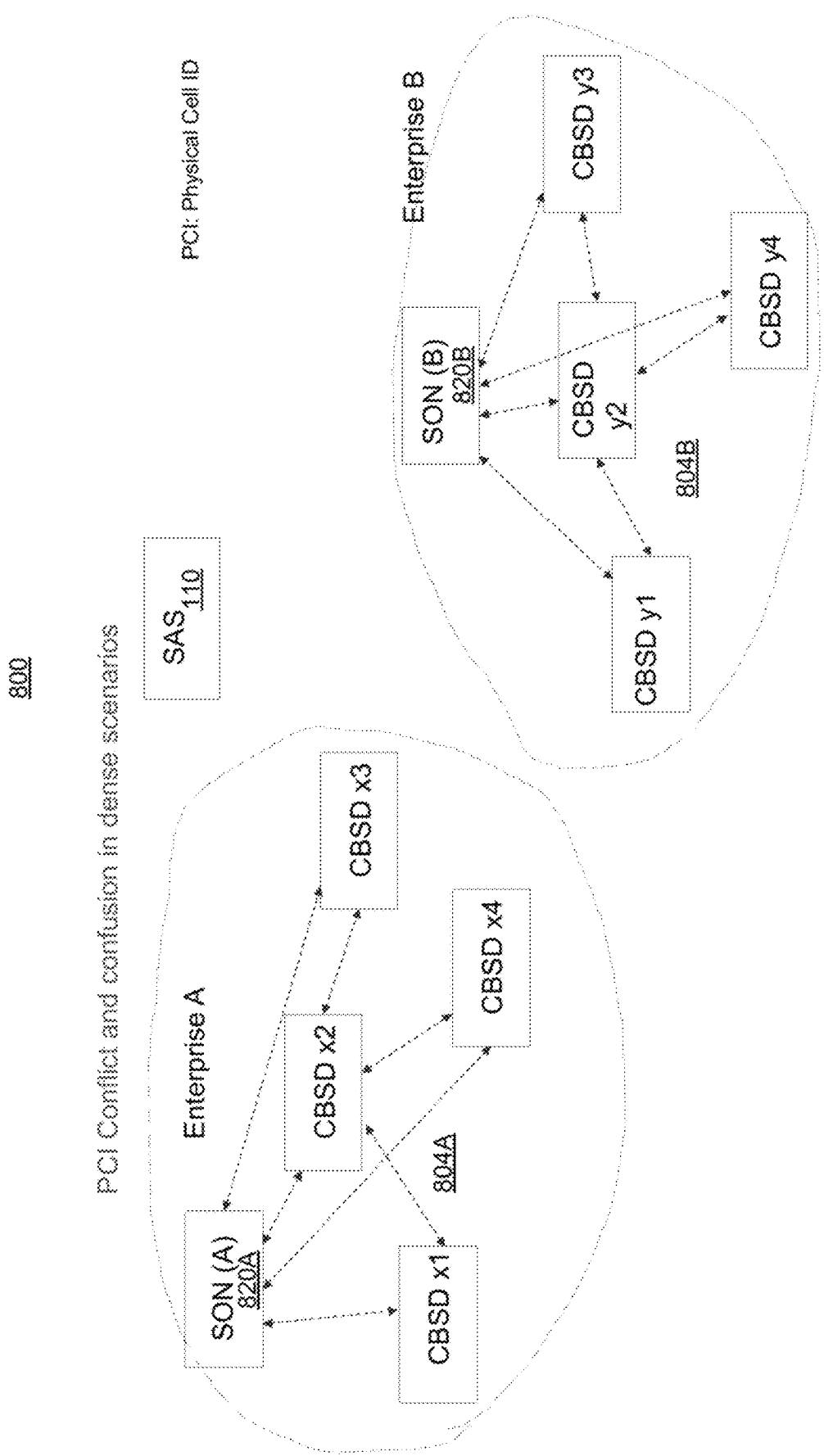
FIG. 8 illustrates a CBRS network with Physical Cell Identifier (PCI) conflicts for some CBSDs shown in dense deployment scenarios, according to some implementations.

FIG. 8 is a diagram of a CBRS network 800 which illustrates another dense scenario. In the CBRS network 800, the SAS 110 can control operation of different groups 804A and 804B of CBSDs. The groups 804A and 804B can pertain to different enterprises or a combination of one or more enterprises, such as enterprises A and B. The different enterprises A and B may also include a Self-Organizing Network (SON), such as SON 820A and 820B, respectively. The SONs 820A-B can include automation technologies designed to make the planning, configuration, management, and optimization of the CBSDs in respective groups 804A-B simpler and faster. The groups 804A-B may also have their own physical cell identifiers (PCIs).

In some instances, PCI conflicts and confusions may arise in dense deployments as shown, because of potential physical cell overlaps. Typically, PCI conflicts are resolved by inter-AP coordination techniques as with existing LTE deployments. In some examples, the SONs 820A-B can also help with PCI conflict management. In dense CBRS deployments such as in a multi-tenant building scenario, each tenant enterprise A, B with its own respective SON 820A or 820B, inter-AP tunnels may be needed for the inter-AP coordination between CBSDs belonging to the different groups or enterprises. Such inter-AP tunnels do not currently exist, and neither are the conventional SONs 820A and 820B capable resolving PCI conflicts across enterprises. Further, some enterprises may not deploy their own SON for cost reasons. Therefore, PCI conflicts are another issue currently not addressed by the conventional SAS 110.

Accordingly it is seen from the above descriptions that the conventional SAS 110 may allocate resources without taking into account the various above-described priorities, performance issues, conflicts, interferences, etc., of the various CBSDs which can belong to different groups, enterprises, etc. Several of these limitations are seen to be exacerbated in dense scenarios.

Systems, techniques, and computer-readable media are described herein for overcoming the above-described limitations of the conventional CBRS network deployments. In example aspects of this disclosure, the SAS can be configured to support enhanced policies and capabilities for managing the resource allocation and traffic in dense deployments. Further, in example aspects the DNA-C can also assist the SAS, along with improvements to the CBSDs (e.g., CBSD APs).

Figure 9:
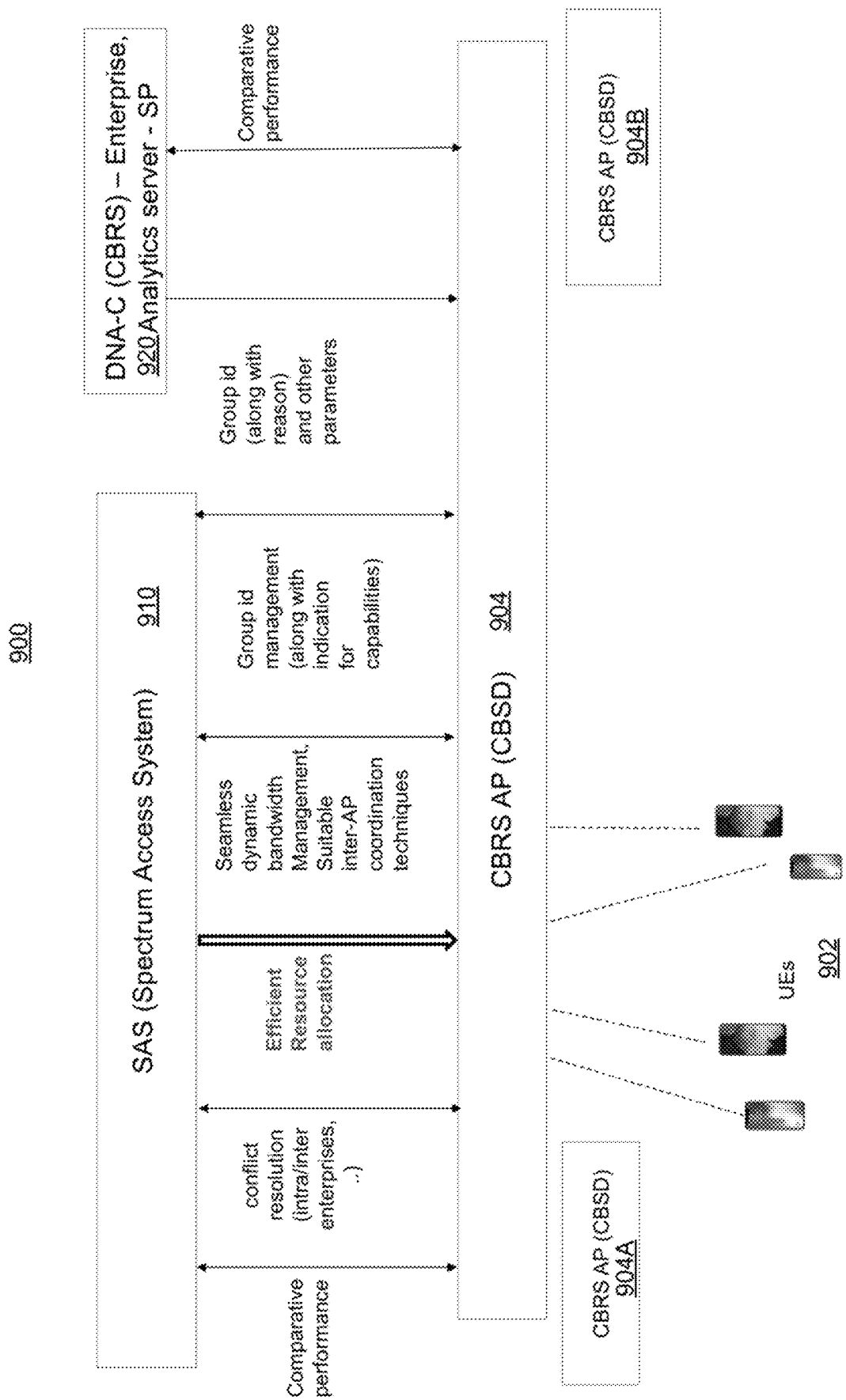
FIG. 9 illustrates an example of a CBRS network architecture for improved management of resource allocations, according to aspects of this disclosure.

FIG. 9 is a diagram which illustrates a CBRS network 900 according to example aspects of this disclosure. The CBRS network 900 includes an example SAS 910, DNA-C 920, and one or more CBSDs (e.g., the CBRS APs 904A, B, etc., collectively, CBRS AP 904) and one or more UEs 902. According to techniques described herein, efficient resource allocation in a CBRS network can be based on a combination of one or more of seamless dynamic channel/bandwidth management, group ID management, PCI conflict resolution, and/or comparative performance indications. For example, the SAS 910, in communication with the one or more CBSDs such as the CBRS AP 904 can implement resource allocation based on one or more of comparative performance, conflict resolution (inter and intra-enterprise), seamless dynamic channel/bandwidth management, and group ID management (including indications for capabilities) using information obtained from the CBSDs. In some examples, the DNA-C can also assist with the resource allocation and management based on one or more of comparative performance and group ID management (including reasons and other parameters) using information obtained from the CBSDs and the CBRS UEs 902. These and other related aspects will be explained in detail with reference to the figures in the following sections.

Priorities and preemption capabilities (and use of that as one set of parameters for creating groups and allocating resources efficiently): SAS has no visibility about the kind of applications that are being supported via a particular CBRS AP. If it is found that a CBRS AP that is using GAA band is causing interference to PAL or incumbent users, this CBRS AP is asked to move to another frequency band. In some cases, there can be multiple CBRS APs using GAA and SAS can manage by asking a subset of these to move to another band but has no direct way of evaluating these options.

Figure 10:
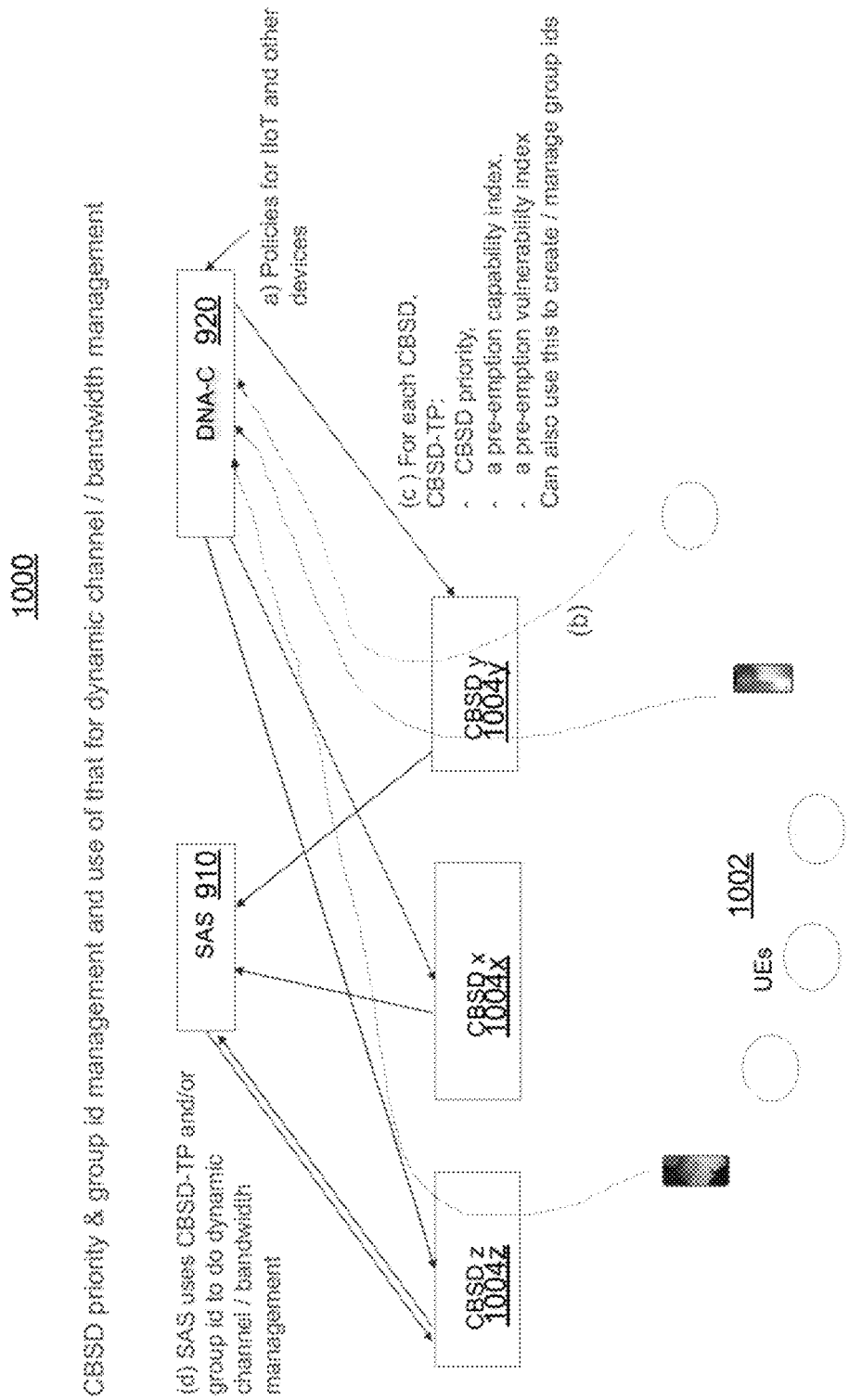
FIG. 10 illustrates an example of a CBRS network architecture for management of resource allocations based on policies, according to aspects of this disclosure.

FIG. 10 illustrates an example deployment of a CBRS network 1000 according to aspects of this disclosure. In the CBRS network 1000, the SAS 910 and/or the DNA-C 920 can be configured to manage resource allocation of one or more CBSDs. For example, the CBSDs can include CBRS APs 1004x-z for providing access to UEs 1002 (e.g., Industrial Internet of Things (IIoT) and other devices of an enterprise network).

In some examples, the DNA-C 920 can provide policies to the CBSDs, and the CBSDs can implement the policies for providing the CBRS UEs with access to the CBRS network. These policies can include a priority, a preemption capability index and a preemption vulnerability index assigned to specific CBSDs. The CBSDs can be assigned parameters such as the priority, preemption capability index, and preemption vulnerability index. For example, the priority level can define the relative importance of a CBSD compared to other CBSDs within the same enterprise. The preemption capability can define whether a CBSD may obtain resources (e.g., channels or frequency ranges) that were already assigned to another CBSD with a lower priority level. The preemption vulnerability index may define whether a CBSD may lose the resources assigned to it in order to admit a CBSD with higher priority level.

As an example, a CBSD serving robotics, machinery, or process control devices deployed in factory floor or workshop can be deemed to have higher priority compared to the CBSDs in reception areas of an enterprise serving visitors. To achieve this priority allocation, corresponding policies may be provided in the DNA-C 920 by the individual enterprises, which can then be sent to the respective CBSDs. Eventually, the policies can be conveyed to the SAS 910, either through interaction with the CBSDs or by the DNA-C 920. The DNA-C 920 can dynamically modify the allocation of parameters such as the channel bandwidth, max EIRP etc., allocated to the CBSDs. The allocation can be based on the priorities as well as the preemption capability and preemption vulnerability index of the CBSD.

For example, the policies of the CBSD including the priority level along with preemption capability index and preemption vulnerability index can be communicated to the SAS 910 during a CBSD Registration Request as new attributes (e.g., during the step 202 of FIG. 2). Based on these policies, the SAS can determine resource grants (e.g., in the step 210 of FIG. 2) as well as dynamic modification of resource allocation to the CBSDs to manage traffic, e.g., in dense deployments.

In some examples, the CBSDs can also provide group IDs (which can be assigned by the DNA-C 920 and/or created by other mechanisms) to the SAS 910, e.g., during the registration or at a later time. For example, the group IDs can include identifications of groups based on pre-emption indices or priority of CBSDs. The resource allocation decisions by the SAS 910 can also be influenced by the group IDs in some examples.

Figure 11:
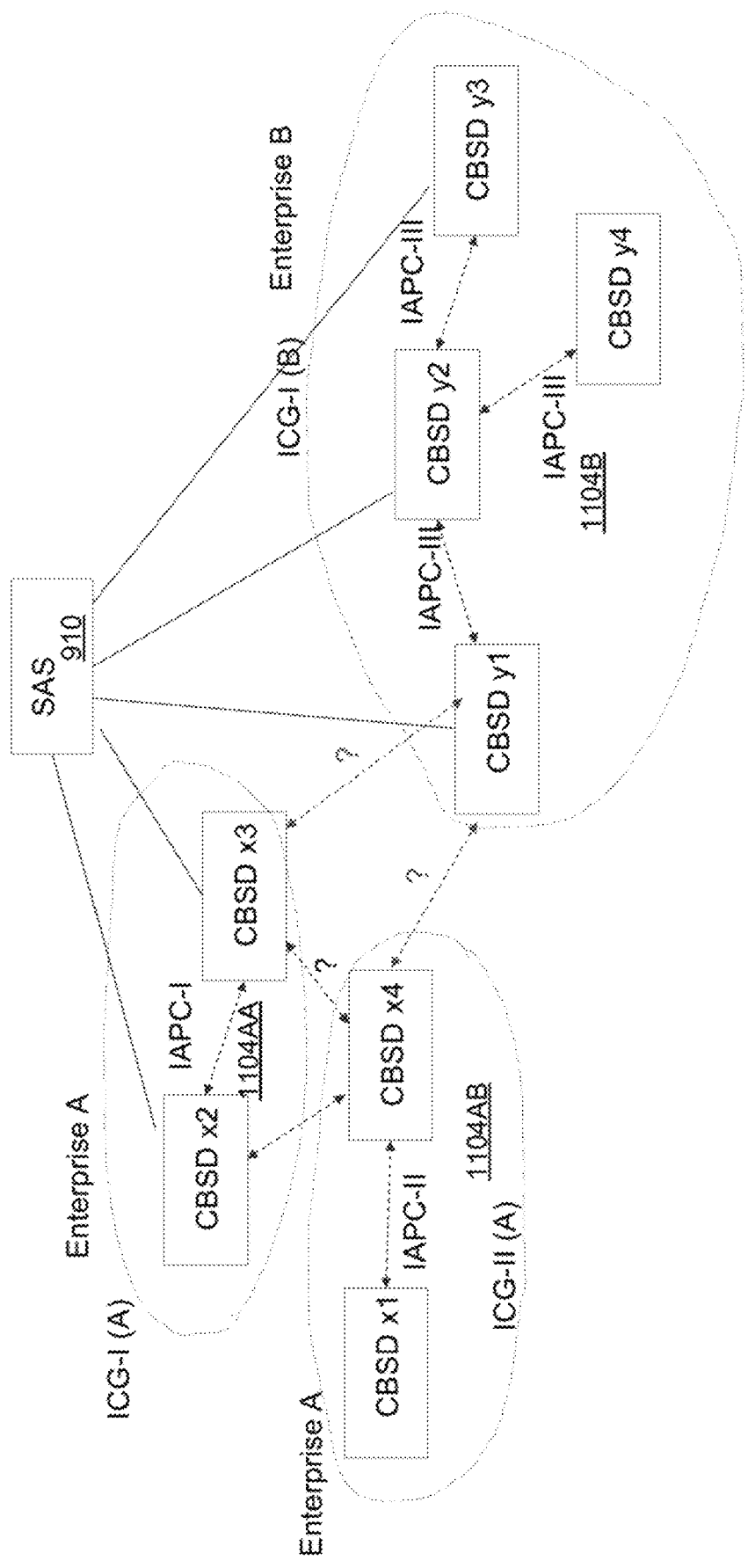
FIG. 11 illustrates an example of a CBRS network architecture for management of resource allocations based on inter-access point (AP) coordination, according to aspects of this disclosure.

FIG. 11 illustrates an example deployment of a CBRS network 1100 according to aspects of this disclosure. In the CBRS network 1100, the SAS 910 can be configured to inter-AP coordination between CBSDs belonging to the same or different groups/networks/enterprises. For example, the CBSDs can include groups 1104AA and 1104AB pertaining to enterprise A and group 1104B pertaining to enterprise B. Inter-AP coordination of CBSDs belonging to the same one of these groups 1104AA, 1104AB, and 1104B, as well as between CBSDs of different groups can be managed by the SAS 910 according to disclosed techniques.

In some examples, inter-AP coordination and interference management capabilities can be implemented based on the following information flow. The CBSDs of each group 1104AA, 1104AB, and 1104B may provide DNA-C 920 (e.g., as part of a capability exchange process) one or more of the following: a corresponding CBSD identity (e.g., a serial number); indication of support for ICIC/eICIC; indication of support for DL CoMP (and possibly other specific CoMP methods supported, such as CoMP-CS or CoMP-CS-BF); indication of support for UL CoMP (including specific CoMP method supported); indication of support for Carrier Aggregation, indication of support and presence of X2 link between Neighbors (including any applicable limit on number of such interfaces, e.g., in dense scenarios); a vendor ID related to the manufacturer or provider of the CBSD and information about whether or not a CBSD of a specific vendor co-exist well with CBSDs from other vendors. The DNA-C 920 may utilize the above information, including combinations thereof, to create groups and assign group IDs to the CBSDs which can be communicated from the CBSDs to the SAS 910 for efficient resource allocation.

For example, the CBSD x3 belongs to the group 1104AA, the CBSD x4 belongs to the group 1104AB, and the CBSD y1 belongs to the group 1104B. The CBSDs x3, x4, and y1 (belong to different groups in same or different enterprises). Based on providing the group IDs of the various groups to the SAS 910, inter-AP coordination among the groups within or amongst different enterprises can be provided or enhanced by the SAS 910. The inter-AP coordination can support improved performance even among groups with different capabilities and performance demands in dense scenarios.

Figure 12:
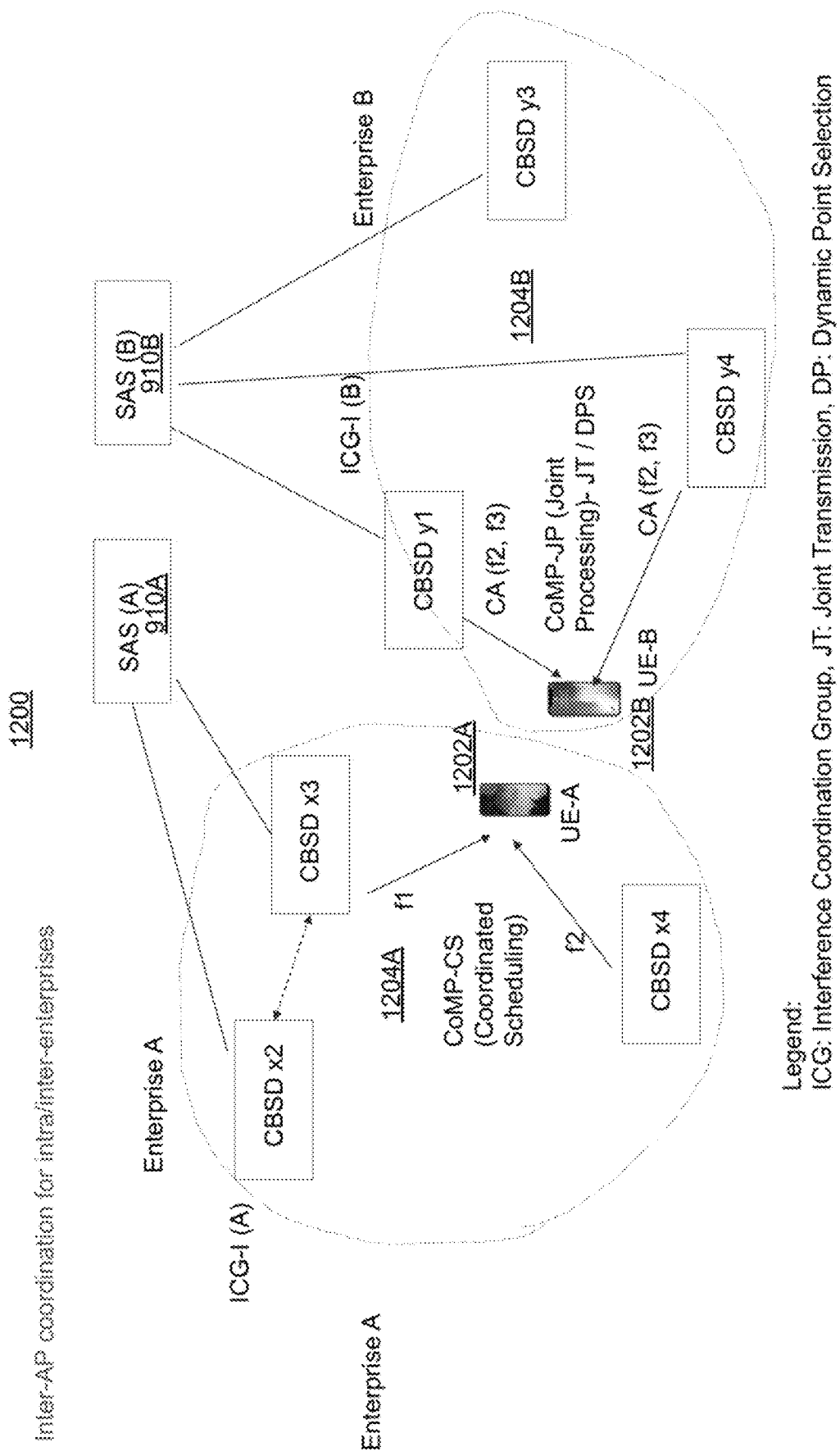
FIG. 12 illustrates another example of a CBRS network architecture for management of resource allocations based on inter-AP coordination, according to aspects of this disclosure.

FIG. 12 is a diagram of a CBRS network 1200 which illustrates example aspects of managing edge users based on inter-AP coordination techniques in dense scenarios. In the CBRS network 1200, different SAS, such as SAS 910A and 910B can be provided for managing respective CBSD groups 1204A and 1204B belonging to enterprises A and B. The UEs 1202A and 1202B may be edge devices for which there may be interference among the different sub channels f1-f3. Within the enterprise A, the CBSDs x3 and x4 of group 1204A, for example, can adopt Coordinated Multipoint Transmission (CoMP) coordinated scheduling techniques for managing CBRS sub channels f1 and f2 for communicating with the same UE 1202A. Similarly, within the enterprise A, the CBSDs y1 and y4 of group 1204B, for example, can adopt CoMP joint processing techniques for carrier aggregation (CA) of frequency sub channels (f2,f3) for communicating with the same UE 1202B. In example aspects, the CBSDs can communicate the above inter-AP coordination techniques to the respective SAS 910A and 910B for the groups 1204A and 1204B. The SAS 910A and 910B may also coordinate with other based on the respective knowledge of inter-AP coordination techniques within the groups 1204A and 1204B.

For example, in order to retain or improve performance of the CBSDs and UEs, for the UE 1202B of the group 1204B (e.g., with group ID ICG-I(B)), the coordination scheme "CoMP-JP with CA(f2,f3)" may be changed to "CoMP-JP (f3)" by the SAS 910B, while the coordination for the group 1204A (e.g., with the group ID ICG-1(A)) may be retrained without change. As another example, for the UE 1202A of the group 1204A, the SAS 910A may change the scheme "CoMP-CS, f1, f2" to "CoMP-BeamForming (f1)" and retain the scheme for ICG-I(B). The above is merely one illustrative example among other possible techniques using suitable combinations of inter-AP coordination techniques.

Figure 13:
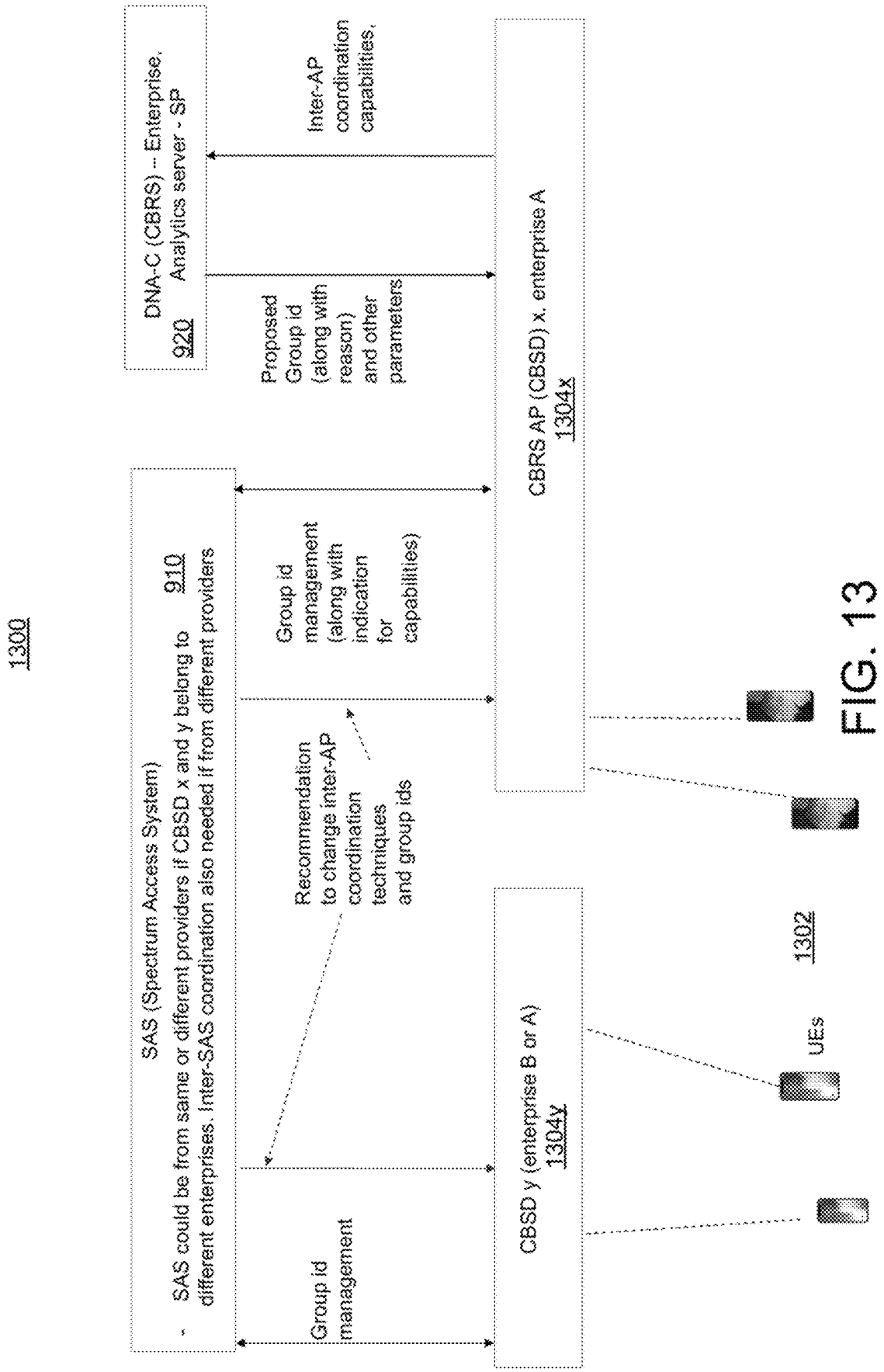
FIG. 13 illustrates an example of a CBRS network architecture for management of resource allocations based on inter-AP coordination and group identifiers (IDs), according to aspects of this disclosure.

FIG. 13 is a diagram which illustrates a CBRS network 1300 according to example aspects of this disclosure. The CBRS network 1300 includes an example SAS 910, DNA-C 920, and one or more CBSDs (e.g., CBRS APs 1304$x$, 1304$y$) and one or more UEs 902. The CBRS AP 1304$x$ may belong to an enterprise A while the CBRS AP 1304$y$ may belong to the same enterprise A or different enterprise B or have an overlap with enterprises A and B. As discussed with reference to FIG. 12, the SAS 910 can include group management capabilities to improve performance of the CBSDs. For example, the SAS 910 may obtain the group IDs of the above CBSDs which may belong to the same or different enterprises, along with the various inter-AP coordination techniques associated with these group IDs. The SAS 910 may determine any modifications to these techniques as discussed with reference to the illustrative examples above and provide such modifications in the form of recommendations to the various CBSDs in the different groups. In this manner, improved coordination is possible between CBSDs of different groups/enterprises.

In some examples, the CBSDs 1304$x$ and 1304$y$ may obtain their group IDs and other parameters from the DNA-C 920 and report their inter-AP coordination capabilities to the DNA-C. For instance, the CBSDs may report any modifications to the inter-AP coordination capabilities that are recommended by the SAS 910 to the DNA-C 920. The DNA-C 920 may assist with inter-AP coordination capabilities of the CBSDs in some examples.

According to techniques described herein, efficient resource allocation in a CBRS network can be based on a combination of one or more of seamless dynamic channel/bandwidth management, group ID management, PCI conflict resolution, and/or comparative performance indications. For example, the SAS 910, in communication with the one or more CBSDs can implement resource allocation based on one or more of comparative performance, conflict resolution (inter and intra-enterprise), seamless dynamic channel/bandwidth management, and group ID management (including indications for capabilities) using information obtained from the CBSDs. In some examples, the DNA-C 920 can also assist with the resource allocation and management based on one or more of comparative performance and group ID management (including reasons and other parameters) using information obtained from the CBSDs. These and other related aspects will be explained in detail with reference to the figures in the following sections.

Figure 14:
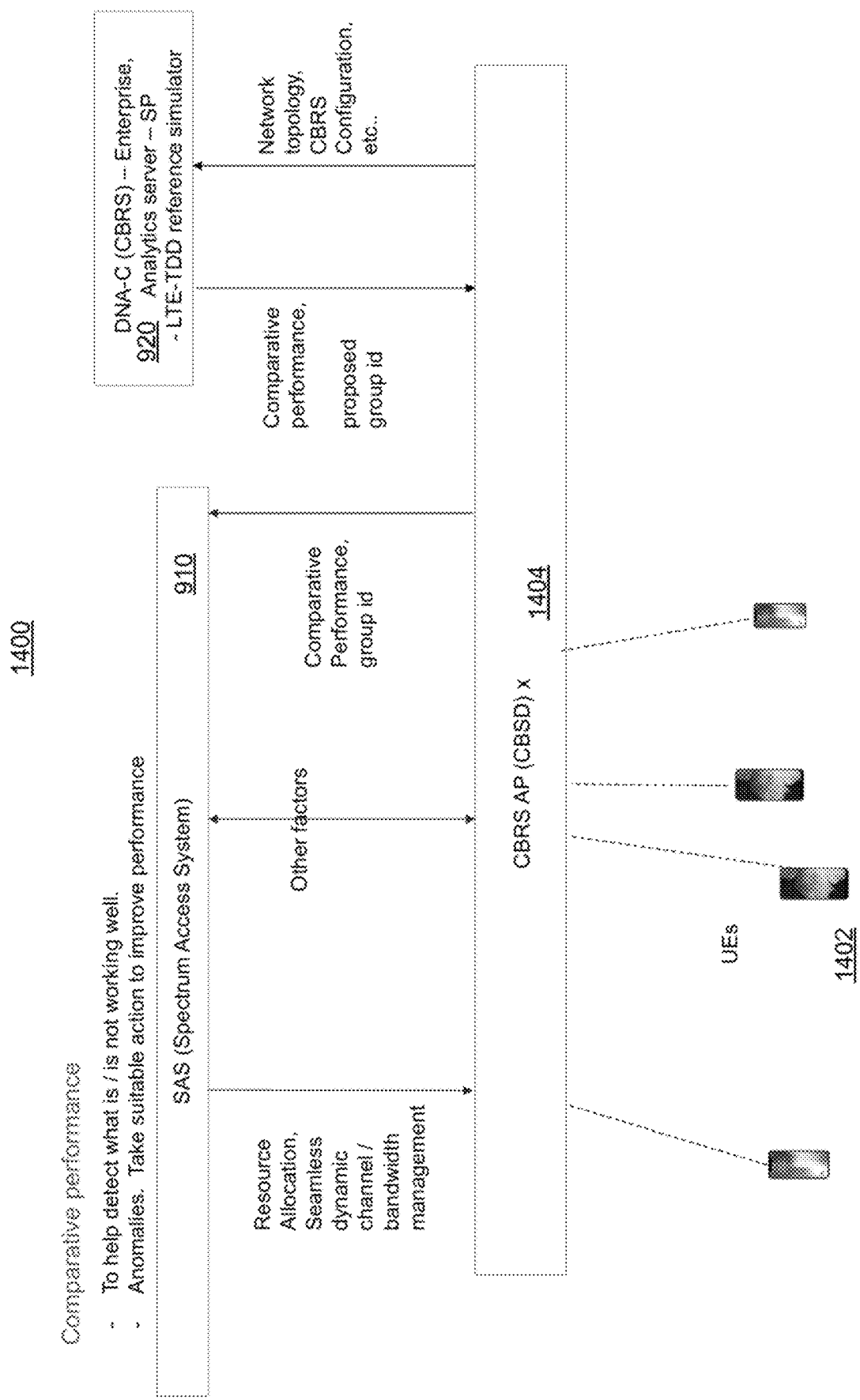
FIG. 14 illustrates an example of a CBRS network architecture for management of resource allocations based on comparative performance indicators, according to aspects of this disclosure.

FIG. 14 is a diagram which illustrates a CBRS network 1400 according to example aspects of this disclosure. The CBRS network 1400 includes an example SAS 910, DNA-C 920, and one or more CBSDs (e.g., CBRS AP 1404) and one or more UEs 1402. The SAS 910 may be configured to obtain comparative performance indicators of the CBSDs. For example, the comparative performance indicators can be analyzed and computed for the CBRS AP 1404 and provided to the SAS 910 dynamically (e.g. periodically or based on certain events). The SAS 910 can update the comparative performance indicators for each of the CBSDs dynamically. For example, if the SAS 910 allocated channel bandwidth to one or more CBSDs at a given time in an enterprise, behavior of a reference LTE-TDD network can be simulated (e.g., at the DNA-C 920) and compared with performance of other CBSDs in the network. The CBSDs can be compared in the CBRS network and in the simulation and the results can be provided to the SAS 910. In some examples, the reference LTE-TDD network can include a LTE-TDD network where whose APs are provided with the same channel bandwidth but a certain level of interference protection is provided to GAA users too (without violating constraints imposed for incumbents and GAA users as in CBRS). Using such a model, the SAS 910 can dynamically change group membership and use the dynamic performance indicators for more efficient resource allocation.

In some examples, the group ID along with comparative performance indicators can be provided by the DNA-C to the CBSDs. For example, some group IDs can have associated policies such as a policy for the CBSDs of a group have similar performance a mix of high and low performance CBSDs. These group based performance policies can be associated with other policies such as those previously discussed with reference to priority and preemption.

In some examples, the SAS 910 may utilize the comparative performance indicators to determine whether there are any anomalies or problems with one of more of the CBSDs. For example, if a comparative performance indicator reported by the CBRS AP 1404 deviates from expectation (e.g., using baselines previously established for the CBRS AP 1404 or other similar CBRS APs), the SAS 910 can determine whether there are any performance problems or anomalies. The SAS 910 may implement any solutions or suitable actions as appropriate. For example, if the performance of the CBRS AP 1404 is determined to be lower than expected, then the SAS 910 may be able to modify allocation of resources to the CBRS AP 1404 (e.g., by providing additional resources) in an effort to boost performance of the CBRS AP 1404 if possible in the context of other CBSDs in the network 1400.

Figure 15:
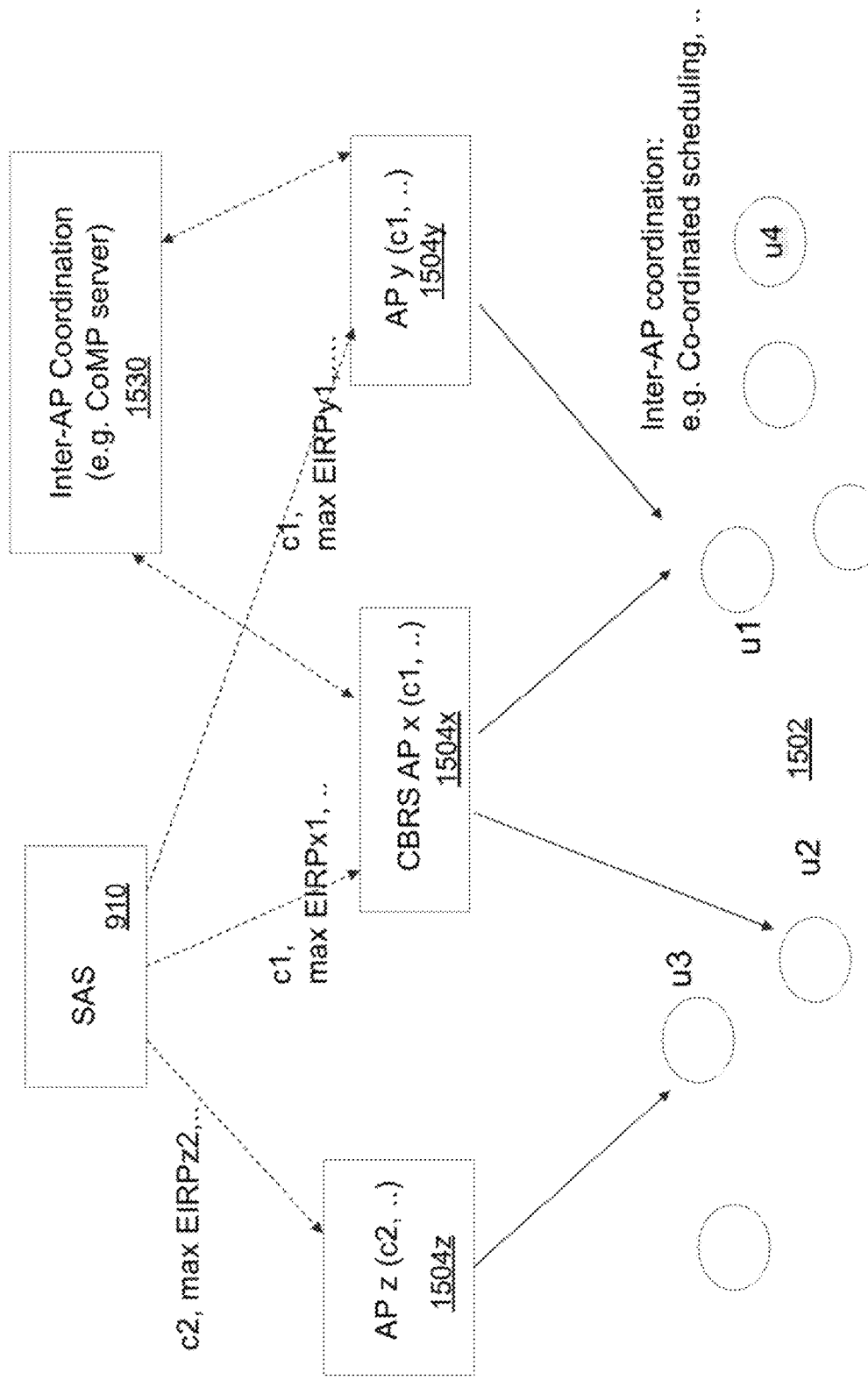
FIG. 15 illustrates an example of a CBRS network architecture for bandwidth management and seamless channel transitions, according to aspects of this disclosure.

FIG. 15 is a diagram which illustrates a CBRS network 1500 configured for seamless channel/bandwidth management and inter-AP coordination according to example aspects of this disclosure. The CBRS network 1500 includes an example SAS 910, and an inter-AP coordination server 1530 along with one or more CBSDs, including CBRS AP 1504$x$-$z$. The inter-AP coordination server 1530 can include a CoMP server and can assist the SAS 910 with inter-AP coordinated scheduling. For example, the CBRS APs 1504$x$ and 1504$y$ can be assigned the same channel c1 (possibly with different max EIRPs). To minimize or eliminate interference, e.g., in dense scenarios, the inter-AP coordination server 1530, in conjunction with the SAS 910, can implement one or more of the above-described inter-AP coordination techniques amongst the CBRS APs 1504$x$ and 1504$y$.

For example, the SAS 910 can implement dynamic bandwidth management, where if the SAS 910 determines that both the CBRS APs 1504$x$ and 1504$y$ may not be able to use the same channel c1, then the SAS 910 can recommend a new channel for the CBRS AP 1504$x$ or to the CBRS AP 1504$y$ that is different from the channel c1.

Figure 16:
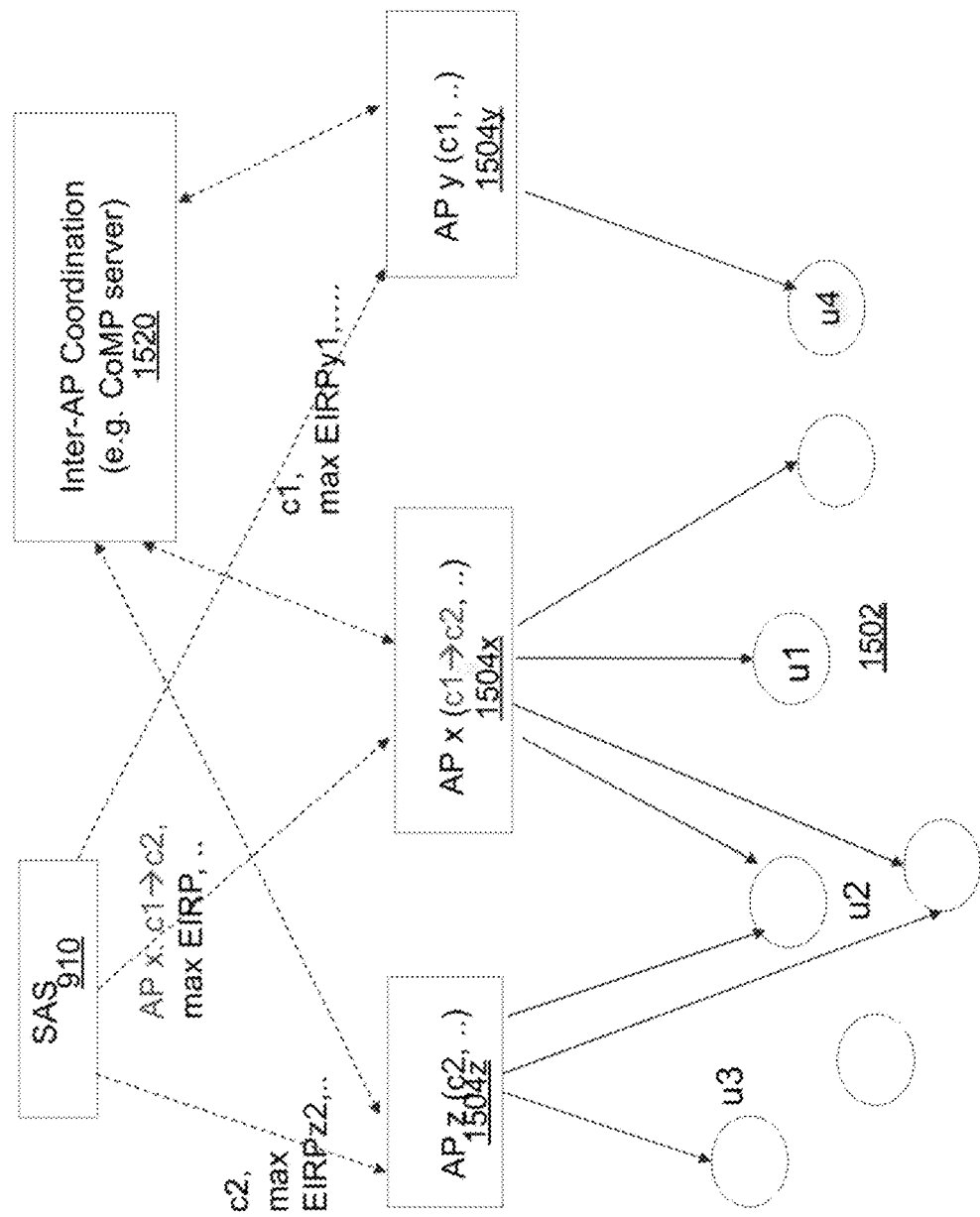
FIG. 16 illustrates another example of a CBRS network architecture for bandwidth management and seamless channel transitions, according to aspects of this disclosure.

FIG. 16 is another view of the CBRS network 1500 where the SAS 910 recommends that the CBRS AP 1504$x$ transition from channel c1 to channel c2 according to an illustrative example. For example, the SAS 910 can also provide a time interval for the CBRS AP 1504$x$/1504$y$ to transition to the alternative channel.

Figure 17:
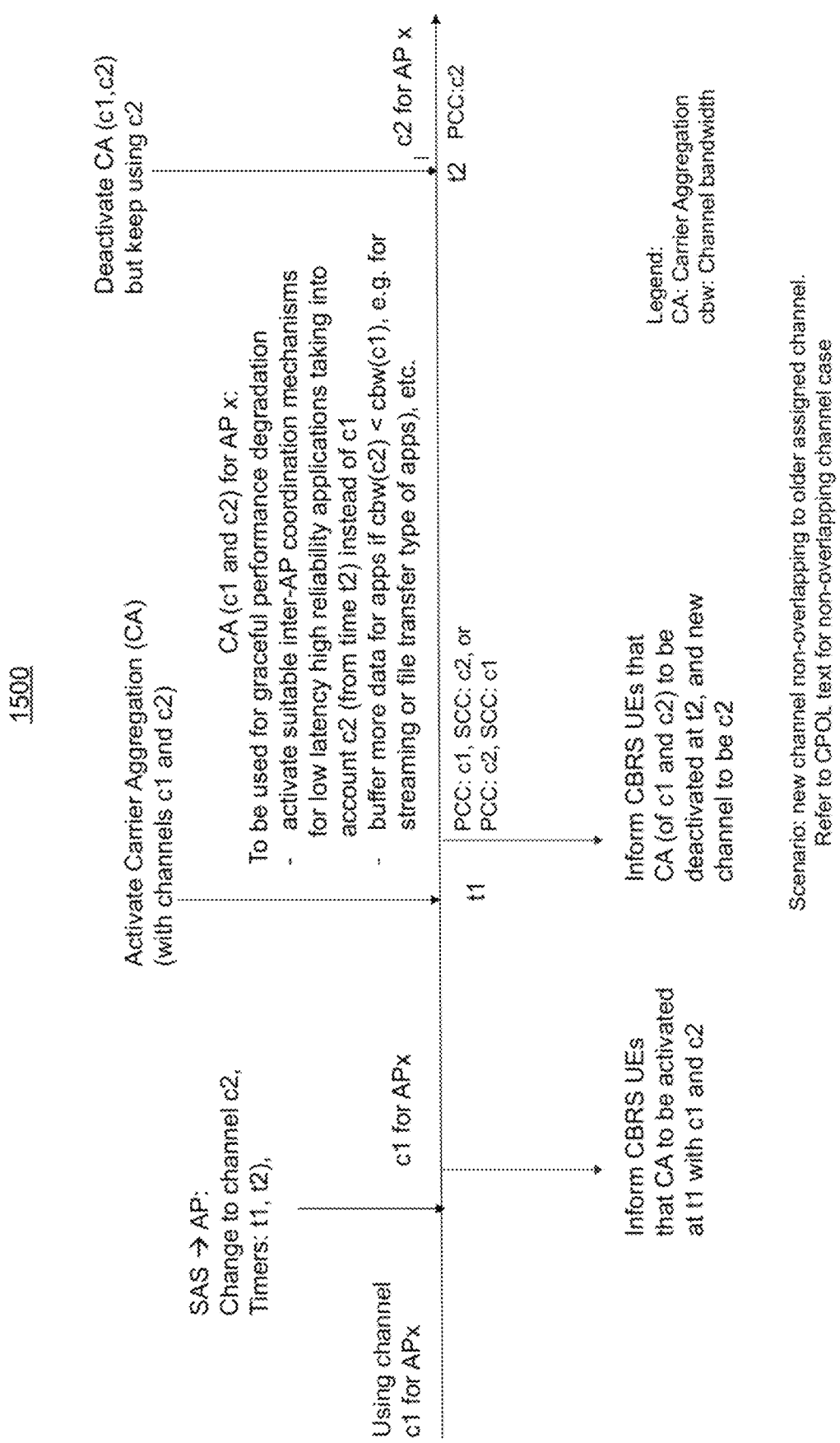
FIG. 17 illustrates a timeline pertaining to a CBRS network architecture for bandwidth management and seamless channel transitions, according to aspects of this disclosure.

FIG. 17 is a timeline associated with the CBRS network 1500. In an example, the SAS 910 can provide two timers to each of the CBRS APs 1504$x$ and 1504$y$. For example, with combined reference to FIGS. 15-17, the SAS 910 may provide two times t1 and t2, where at a time t2, the currently granted channel (e.g., channel c1 at 10 MHz) may be set to expire, and a time t1 the new/alternative channel (e.g., a channel c2 at 30 MHz) may become available. The time t2 may be greater than the time t1, such that the new channel is made available at time t1 before the current channel's grant expires at time t2. This way, the CBRS AP transitioning to the new channel can be provided with sufficient time to do so.

In another example, the SAS 910 may direct the CBRS APs 1504$x$ and 1504$y$ to estimate a difference the time interval needed for the transition (e.g., the difference between the time t1 and the time t2 using factors such as capabilities of the CBRS APs 1504$x$ and 1504$y$, capabilities of the respective UEs 1502, types of applications executing on the UEs 1502, etc.). The CBRS APs 1504$x$ and 1504$y$ can communicate these time intervals to the SAS 910, whereby the SAS 910 may be able to adjust the time interval for transition as needed, further based on factors such as reasons to transition, the criticality of these reasons, etc. In this way, the SAS 910 can implement the seamless transition to the new channel after determining that a transition is necessary.

In some examples, if CBRS AP 1504$x$ is directed to transition to the new channel c2, then it's operation may be instructed by the SAS 910 to be moved to a Carrier Aggregation (CA) Mode (particularly, for example, when the newly assigned channel c2 is not overlapping with the current channel c1). The CA mode operation can be instructed for the time interval based on the times t1 and t2, e.g., during the time t1 to t2. For communication with the UEs 1502 for activation and de-activation of the CA mode the CBRS AP 1504$x$ can use existing 3GPP procedures, with the above timeline adjusted as needed for the change to 3GPP. If the current and new channels c1 and c2 can include overlaps, then the CBSD AP 1504$x$ can be instructed to either expand the current channel c1's bandwidth dynamically as needed or activate and de-activate the CA mode, but with a modified parameter set (e.g. with the channel c1 contributing the 10 MHz and the remaining 20 MHz from the channel c2's 30 MHz).

As shown in FIG. 16, upon the transition to channel c2, the CBRS AP 1504$x$ can potentially interfere with the CBRS AP 1504$z$ which was previously allocated the channel c2. In some examples, one or more of the above-described inter-AP coordination techniques can be activated for managing the potential interference on the channel c2 between the CBRS AP 1504$z$ and the CBRS AP 1504$x$.

Figure 18:
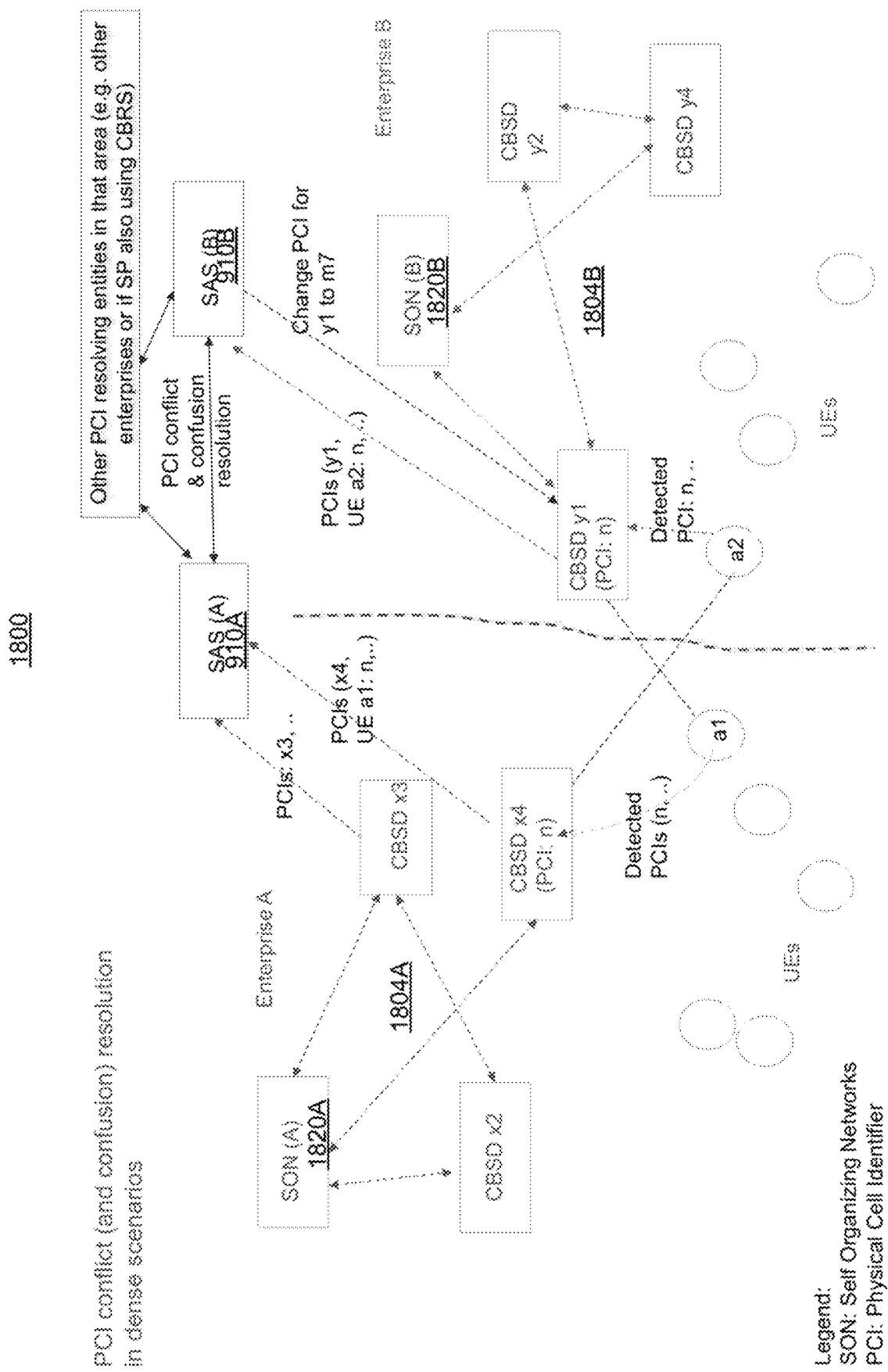
FIG. 18 illustrates an example of a CBRS network architecture for management of resource allocations based on PCI conflict resolution, according to aspects of this disclosure.

FIG. 18 is a diagram of a CBRS network 1800 configured for PCI conflict management according to aspects of this disclosure. In the CBRS network 1800, the SAS 910A and 910B can respectively control operations of different groups 1804A and 1804B of CBSDs. The groups 1804A and 1804B can pertain to different enterprises or a combination of one or more enterprises, such as enterprises A and B. The different enterprises A and B may also include Self-Organizing Networks (SONs) such as SON 1820A and 1820B, respectively. The SONs 1820A-B can include automation technologies designed to make the planning, configuration, management, and optimization of the CBSDs in respective groups 1804A-B simpler and faster. The groups 1804A-B may also have their own physical cell identifiers (PCIs) which may have been provided by a DNA-C (not shown in this view).

In some instances, PCI conflicts and confusions may arise in dense deployments as shown, because of potential physical cell overlaps. In some examples, the PCI conflicts can be resolved by inter-AP coordination techniques previously discussed. In some examples, the SAS 910A-B in conjunction with the respective SONs 1820A-B can be configured to help with PCI conflict management. In dense CBRS deployments such as in a multi-tenant building scenario, each tenant enterprise A, B with its own respective SON 1820A or 1820B, inter-AP tunnels can be utilized for the inter-AP coordination between CBSDs belonging to the different groups or enterprises.

In some examples, the SAS 910A and 910B can request the CBSDs in each of the groups 1804A-B to provide the PCIs of their cells and those of neighboring cells in enhanced CBSD-SAS messages. For example, referring to FIG. 2, the enhanced CBSD-SAS messages can be based on one or more of the Registration Response of step 204, the Spectrum Inquiry Response of step 206, the Grant Response of step 210, or in a Heartbeat Response message.

The CBSDs in the groups 1804A-B in turn request their respective UEs 1802 (especially the edge users or UEs 1802 at the edges of the groups/domains) to perform intra-frequency cell measurement to obtain the PCIs (e.g., where neighboring cell details can be provided to UEs via CBSD SIB broadcasts). The CBSDs can then provide the PCI, CBRS-PLMID (S-HNI) and CBRS network name (e.g., obtained via UEs) to the respective SAS 910A-B. In an illustrative example, Sensors, enhanced with CBRS listening radio, can be placed at cell edges as listen-only sensors and these sensors can report neighboring cell PCIs, CBRS-PLMID (S-HNI), CBRS network names, etc., to the respective CBSDs to then be reported to the SAS 910A-B.

In some examples, the CBSDs can report the collected (or detected) PCIs as group objects in CoexMeasInfo reports in Heartbeat Responses to the SAS 910A-B at regular intervals. In some examples, providers of the SAS 910A and 910B can exchange these PCIs as part of essential CBSD data with other SAS providers in that area and the providers of the SAS 910A and 910B can agree to conflict-free PCIs for each CBRS AP in the groups 1804A-B. In some examples, the SAS 910A-B can assign the conflict-free PCIs along with other operational parameters to the CBSDs in the groups 1804A-B. The SAS 910A-B can also indicate the assigned PCI in the Grant Response before the transmit starts, or in the Heartbeat Response message if the SAS intends to recommend another PCI for improved cell performance for that CBSD.

Having described example systems and concepts, the disclosure now turns to FIG. 19 illustrating a flow chart of process 1900 directed to a method of managing resources of one or more Citizens Broadband Radio Service (CBRS) networks by a Spectrum Access System (SAS). For example, the process 1900 can include one or more of the above-described methods in CBRS networks of FIGS. 9-18 performed by the SAS 910 (or the combination of one or more SAS such as the SAS 910A and 910B). The steps or blocks outlined herein are examples and can be implemented in any combination thereof, including combinations that exclude, add, or modify certain steps.

At block 1902, the process 1900 can include evaluating available resources in the one or more CBRS networks, the resources comprising at least one or more channels of the CBRS spectrum available to one or more CBRS devices (CBSDs) of the one or more CBRS networks. For example the SAS 910 can evaluate available resources in the CBRS network 900, the resources comprising at least one or more channels of the CBRS spectrum (e.g., for GAA/PAL users) available to one or more CBSDs of the one or more CBRS networks. In some examples, one or more CBRS UE 902 access the CBRS network 900 via the one or more CBSDs (e.g., via the CBRS APs 904).

At block 1904, the process 1900 can include receiving one or more policies associated with the one CBSDs, wherein a policy of a CBSD comprises one or more of a priority, a pre-emption capability index and a pre-emption vulnerability index associated with the CBSD. For example, the SAS 910 can receive one or more policies from the CBRS APs 904, where the policies can include the priority, pre-emption capability index and/or pre-emption vulnerability index associated with various CBRS APs 904A, 904B, etc. (which collectively form the CBRS APs 904). In some examples, these policies can be received by the CBSDs or CBRS APs 904 from the DNA-C 920.

At block 1906, the process 1900 can include determining one or more parameters associated with the one or more CBSDs based on the available resources and the one or more policies, wherein a parameter associated with the CBSD comprises at least a frequency range in the one or more channels and a transmit Effective Isotropic Radiated Power (EIRP). For example, the SAS 910 can grant (using the flow chart 200 or other similar process) one or more channels and max EIRPs to the various CBRS APs 904 based on the available resources of the CBRS network 900 and the policies associated with the CBRS APs 904.

In some examples, the SAS 910 can also receive one or more inter-access point (AP) coordination capabilities associated with the one or more CBRS APs. For example, as described with reference to the CBRS network 1100 of FIG. 11, the inter-AP coordination and interference management capabilities can be obtained from the DNA-C 920 by the CBSDs based on the above-described information flow, where the CBSDs of each group 1104AA, 1104AB, and 1104B may provide DNA-C 920 information as part of a capability exchange process. The information can include one or more of a corresponding CBSD identity, indication of support for ICIC/eICIC, DL CoMP, UL CoMP, Carrier Aggregation, vendor ID, support for other vendors, etc. The DNA-C 920 may utilize the above information to create groups and assign group IDs to the CBSDs which can be communicated from the CBSDs to the SAS 910 for efficient resource allocation.

For example, the SAS 910 can obtain information about grouping such as the CBSD x3 belongs to the group 1104AA, the CBSD AP x4 belongs to the group 1104AB, and the CBSD AP y1 belongs to the group 1104B. Based on the group IDs of the various groups to the SAS 910, inter-AP coordination among the groups within or amongst different enterprises can be provided or enhanced by the SAS 910. In some examples, the SAS 910 can determine performance modifications based on the inter-AP coordination capabilities. The SAS 910 can determine performance modifications for improved performance even among groups with different capabilities and performance demands in dense scenarios by modifying resource allocations to the one or more CBRS APs.

In some examples, the SAS 910 can determine at least one new channel for at least one CBSD based on the performance modifications. For example, as discussed with reference to the CBRS network 1500 of FIGS. 15-16, the SAS 910 can determine a change from channel c1 to channel c2 for the CBRS AP 1504$x$ (possibly in coordination with an inter-AP coordination server 1520). The SAS 910 can determine a time interval for a seamless transition from a current channel to the new channel for the at least one CBRS AP 1504$x$ and provide the time interval and one or more associated time instances (e.g., the times t1 and t2 as shown in FIG. 17) to the at least one CBRS AP 1504$x$.

In some examples, the SAS 910A and 910B can obtain one or more physical cell identifiers (PCIs) associated with one or more groups of the CBSDs, such as the groups 1804A and 1804B shown in the CBRS network 1800 of FIG. 18. The SAS 910A and 910B can determine one or more resource conflicts between the one or more groups based on the PCIs and edge users of the groups and determine one or more modifications to the resource allocations to resolve the one or more conflicts based on the one or more PCIs and the inter-AP coordination capabilities. In some examples, the SAS 910B can be associated with at least a first enterprise A, and manage resources of the CBRS network 1800 based on communicating with SAS 910B of at least a second enterprise B, where the one or more groups 1804A-B belong to one or more of the first enterprise or the second enterprise. In some examples, the one or more enterprises A and B can further include respective one or more Self-Organizing Networks (SONs) 1820A and 1820B.

In some examples, the SAS 910 of the CBRS network 1400 can obtain one or more comparative performance indicators from the one or more CBSDs such as the CBRS AP 1404, where the comparative performance indicators may be obtained by the CBRS AP 1404 from the DNA-C 920. The SAS 910 can determine whether there are performance anomalies for the one or more CBSDs of the CBRS network 1400 based on the one or more comparative performance indicators.

FIG. 20 is a flow chart of process 2000 directed to a method of managing resources of one or more Citizens Broadband Radio Service (CBRS) networks by a by a CBRS access point (AP). For example, the process 2000 can include one or more of the above-described methods in CBRS networks of FIGS. 9-18 performed by the respective CBRS APs. The steps or blocks outlined herein are examples and can be implemented in any combination thereof, including combinations that exclude, add, or modify certain steps.

At block 2002, the process 2000 can include receiving one or more policies associated with one CBRS devices (CBSDs), from a Digital Network Architecture Center (DNA-C), wherein a policy of the CBSD comprises one or more of a priority, a pre-emption capability index and a pre-emption vulnerability index associated with the CBSD. For example, the CBRS AP 904 of the CBRS network 900 can receive the policies from the DNA-C 920.

At block 2004, the process 2000 can include determining resource requirements of one or more CBRS user equipment (UEs) managed by the one or more CBSDs. For example, the CBRS AP 904 can determine respective resource requirements of the CBRS UEs 902 managed by the CBRS APs 904.

At block 2006, the process 2000 can include providing the one or more policies and the resource requirements to a Spectrum Access System (SAS). For example, the CBRS AP 904 can collect the information obtained from the DNA-C and other CBSDs and provide the information to the SAS 910.

In some examples, the CBSDs can determine (e.g., in coordination with the DNA-C 920) one or more inter-AP coordination capabilities for coordinating with one or more other CBSDs, and provide the one or more inter-AP coordination capabilities to the SAS. For example, the CBRS APs shown in the CBRS network 1800 can determining one or more physical cell identifiers (PCIs) of one or more cells or groups 1804A-B associated with the CBSDs, as well as the PCIs of the one or more neighboring CBSDs. For example, the CBSDs can obtain the PCIs from the DNA-C 920 or use sensors to obtain this information from neighboring cells, etc. The CBSDs can provide the PCIs to the SAS 910A-B in enhanced CBSD-SAS messages in some examples, as discussed previously. In some examples, the CBSDs can report the collected (or detected) PCIs as group objects in CoexMeasInfo reports in Heartbeat Responses to the SAS 910A-B at regular intervals. In some examples, providers of the SAS 910A and 910B can exchange these PCIs as part of essential CBSD data with other SAS providers in that area and the providers of the SAS 910A and 910B can agree to conflict-free PCIs for each CBSD in the groups 1804A-B. In some examples, the SAS 910A-B can assign the conflict-free PCIs along with other operational parameters to the CBSDs in the groups 1804A-B. The SAS 910A-B can also indicate the assigned PCI in the Grant Response before the transmit starts, or in the Heartbeat Response message if the SAS intends to recommend another PCI for improved cell performance for that CBSD.

In some examples, the CBSDs can receive one or more parameters from the SAS 910, the one or more parameters comprising at least a frequency range in one or more channels and maximum transmit Effective Isotropic Radiated Power (EIRP), and determine resources for the one or more CBRS UEs based on the one or more parameters. For example, as shown in the CBRS network 1000 of FIG. 10, the CBSDs 1004x-z can obtain the resource assignments (e.g., channels, max EIRP, etc.) and other parameters from the SAS 910 and allocate appropriate resources for communication with their respective UEs 1002.

Figure 21:
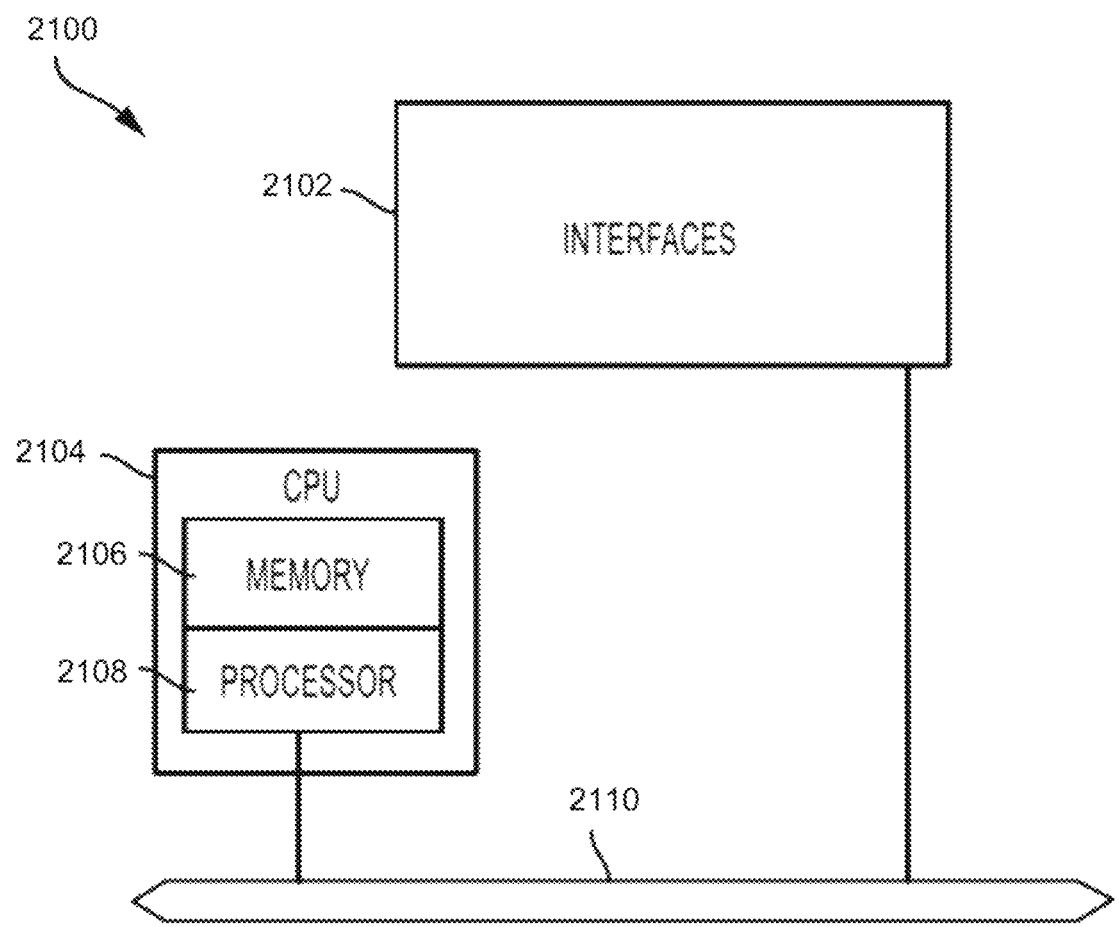
FIG. 21 illustrates an example network device in accordance with various examples.

FIG. 21 illustrates an example network device 2100 suitable for implementing policy agents and performing switching, routing, and other networking operations described herein, for example, with reference to the processes 1900 and 2000 of FIGS. 19-20. The network device 2100 includes a central processing unit (CPU) 2104, interfaces 2102, and a connection 2110 (e.g., a PCI bus). When acting under the control of appropriate software or firmware, the CPU 2104 is responsible for executing packet management, error detection, and/or routing functions. The CPU 2104 preferably accomplishes all these functions under the control of software including an operating system and any appropriate applications software. The CPU 2104 may include one or more processors 2108, such as a processor from the INTEL X86 family of microprocessors. In some cases, the processor 2108 can be specially designed hardware for controlling the operations of the network device 2100. In some cases, a memory 2106 (e.g., non-volatile RAM, ROM, etc.) also forms part of the CPU 2104. However, there are many different ways in which memory could be coupled to the system.

The interfaces 2102 are typically provided as modular interface cards (sometimes referred to as "line cards"). Generally, they control the sending and receiving of data packets over the network and sometimes support other peripherals used with the network device 2100. Among the interfaces that may be provided are Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces, Gigabit Ethernet interfaces, ATM interfaces, HSSI interfaces, POS interfaces, FDDI interfaces, WIFI interfaces, 3G/4G/5G cellular interfaces, CAN BUS, LoRA, and the like. Generally, these interfaces may include ports appropriate for communication with the appropriate media. In some cases, they may also include an independent processor and, in some instances, volatile RAM. The independent processors may control such communications intensive tasks as packet switching, media control, signal processing, crypto processing, and management. By providing separate processors for the communications intensive tasks, these interfaces allow the master microprocessor 2104 to efficiently perform routing computations, network diagnostics, security functions, etc.

Although the system shown in FIG. 21 is one specific network device of the present technologies, it is by no means the only network device architecture on which the present technologies can be implemented. For example, an architecture having a single processor that handles communications as well as routing computations, etc., is often used. Further, other types of interfaces and media could also be used with the network device 2100.

Regardless of the network device's configuration, it may employ one or more memories or memory modules (including memory 2106) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc. Memory 2106 could also hold various software containers and virtualized execution environments and data.

The network device 2100 can also include an application-specific integrated circuit (ASIC) 2112, which can be configured to perform routing and/or switching operations. The ASIC 2112 can communicate with other components in the network device 400 via the connection 2110, to exchange data and signals and coordinate various types of operations by the network device 2100, such as routing, switching, and/or data storage operations, for example.

Figure 22:
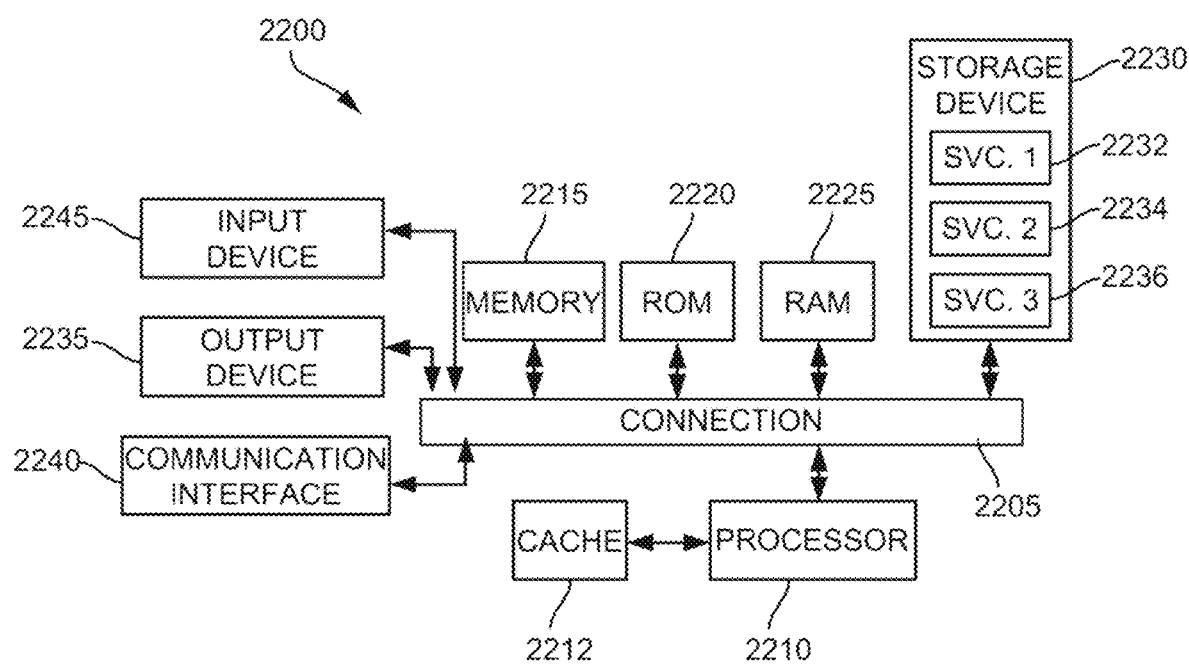
FIG. 22 illustrates an example computing device in accordance with various examples.

FIG. 22 illustrates a computing system architecture 2200 wherein the components of the system are in electrical communication with each other using a connection 2205, such as a bus. The example system 2200 includes a processing unit (CPU or processor) 2210 and a system connection 2205 that couples various system components including the system memory 2215, such as read only memory (ROM) 2220 and random access memory (RAM) 2225, to the processor 2210. The system 2200 can include a cache of high-speed memory connected directly with, in close proximity to, or integrated as part of the processor 2210. The system 2200 can copy data from the memory 2215 and/or the storage device 2230 to the cache 2212 for quick access by the processor 2210. In this way, the cache can provide a performance boost that avoids processor 2210 delays while waiting for data. These and other modules can control or be configured to control the processor 2210 to perform various actions. Other system memory 2215 may be available for use as well. The memory 2215 can include multiple different types of memory with different performance characteristics. The processor 2210 can include any general purpose processor and a hardware or software service, such as service 1 2232, service 2 2234, and service 3 2236 stored in storage device 530, configured to control the processor 2210 as well as a special-purpose processor where software instructions are incorporated into the actual processor design. The processor 2210 may be a completely self-contained computing system, containing multiple cores or processors, a bus, memory controller, cache, etc. A multi-core processor may be symmetric or asymmetric.

To enable user interaction with the computing device 2200, an input device 2245 can represent any number of input mechanisms, such as a microphone for speech, a touch-sensitive screen for gesture or graphical input, keyboard, mouse, motion input, speech and so forth. An output device 2235 can also be one or more of a number of output mechanisms known to those of skill in the art. In some instances, multimodal systems can enable a user to provide multiple types of input to communicate with the computing device 2200. The communications interface 2240 can generally govern and manage the user input and system output. There is no restriction on operating on any particular hardware arrangement and therefore the basic features here may easily be substituted for improved hardware or firmware arrangements as they are developed.

Storage device 2230 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 2225, read only memory (ROM) 2220, and hybrids thereof.

The storage device 2230 can include services 2232, 2234, 2236 for controlling the processor 2210. Other hardware or software modules are contemplated. The storage device 2230 can be connected to the system connection 2205. In one aspect, a hardware module that performs a particular function can include the software component stored in a computer-readable medium in connection with the necessary hardware components, such as the processor 2210, connection 2205, output device 2235, and so forth, to carry out the function.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language reciting "at least one of" a set indicates that one member of the set or multiple members of the set satisfy the claim. For example, claim language reciting "at least one of A and B" means A, B, or A and B.

What is claimed is:

1. A method comprising:
   receiving, at a Citizens Broadband Radio Service device (CBSD), one or more policies associated with the CBSD;
   determining, based on the one or more policies, one or more resource requirements of one or more Citizens Broadband Radio Service user equipments (UEs) managed by the CBSD, wherein the one or more policies comprise at least one of a priority, a pre-emption capability index, or a pre-emption vulnerability index;
   providing the one or more policies and the one or more resource requirements to a spectrum access system (SAS); and
   receiving, from the SAS, one or more parameters for allocating resources for communication with the one or more UES.

2. The method of claim 1, further comprising:
   determining one or more inter-access point (AP) coordination capabilities for coordinating with one or more neighboring CBSDs; and
   providing the one or more inter-AP coordination capabilities to the SAS.

3. The method of claim 2, further comprising:
   receiving a time interval for a seamless transition from a current channel to a new channel for the CBSD; and
   receiving one or more time instances associated with the time interval.

4. The method of claim 1, further comprising:
   determining one or more physical cell identifiers (PCIs) of one or more cells associated with the CBSD and one or more neighboring CBSDs; and
   providing the one or more PCIs to the SAS.

5. The method of claim 1, wherein the one or more parameters comprising at least one of a frequency range in one or more channels or a maximum transmit Effective Isotropic Radiated Power (EIRP); and further comprising:
   determining resources for the one or more UEs based on the one or more parameters.

6. The method of claim 1, wherein the one or more policies are received from at least one of a Digital Network Architecture Center (DNA-C) or a network device comprising a network controller.

7. A Citizens Broadband Radio Service device (CBSD) comprising:
   one or more processors; and
   at least one non-transitory computer-readable medium comprising instructions which, when executed by the one or more processors, cause the one or more processors to:
      receive one or more policies associated with the CBSD;
      determine, based on the one or more policies, one or more resource requirements of one or more Citizens Broadband Radio Service (CBRS) user equipments (UEs) managed by the system, wherein the one or more policies comprise at least one of a priority, a pre-emption capability index, or a pre-emption vulnerability index;
      provide the one or more policies and the one or more resource requirements to a spectrum access system (SAS); and
      receive, from the SAS, one or more parameters for allocating resources for communication with the one or more UES.

8. The CBSD of claim 7, wherein the at least one non-transitory computer-readable medium further comprising instructions which, when executed by the one or more processors, cause the one or more processors to:
   determine one or more inter-access point (AP) coordination capabilities for coordinating with one or more neighboring CBSDs; and
   provide the one or more inter-AP coordination capabilities to the SAS.

9. The CBSD of claim 7, where the at least one non-transitory computer-readable medium further comprising instructions which, when executed by the one or more processors, cause the one or more processors to:
   receive a time interval for a seamless transition from a current channel to a new channel for the CBSD; and
   receive one or more time instances associated with the time interval.

10. The CBSD of claim 7, the at least one non-transitory computer-readable medium further comprising instructions which, when executed by the one or more processors, cause the one or more processors to:
    determine one or more physical cell identifiers (PCIs) of one or more cells associated with the CBSD and one or more neighboring CBSDs; and
    provide the one or more PCIs to the SAS.

11. The CBSD of claim 7, wherein the one or more parameters comprising at least one of a frequency range in one or more channels or a maximum transmit Effective Isotropic Radiated Power (EIRP); and the at least one non-transitory computer-readable medium further comprising instructions which, when executed by the one or more processors, cause the one or more processors to:
    determine resources for the one or more CBRS UEs based on the one or more parameters.

12. The CBSD of claim 7, wherein the one or more policies are received from at least one of a Digital Network Architecture Center (DNA-C) or a network controller.

13. A non-transitory computer-readable medium comprising instructions which, when executed by one or more processors, cause the one or more processors to:
    receive, at a Citizens Broadband Radio Service device (CBSD), one or more policies associated with the CBSD;
    determine, based on the one or more policies, one or more resource requirements of one or more CBRS user equipments (UEs) managed by the CBSD, wherein the one or more policies comprise at least one of a priority, a pre-emption capability index, or a pre-emption vulnerability index;
    provide the one or more policies and the one or more resource requirements to a spectrum access system (SAS); and
    receive, from the SAS, one or more parameters for allocating resources for communication with the one or more UEs.

14. The non-transitory computer-readable medium of claim 13, further comprising instructions which, when executed by the one or more processors, cause the one or more processors to:
    determine one or more inter-access point (AP) coordination capabilities for coordinating with one or more neighboring CBSDs; and
    provide the one or more inter-AP coordination capabilities to the SAS.

15. The non-transitory computer-readable medium of claim 13, further comprising instructions which, when executed by the one or more processors, cause the one or more processors to:
    receive a time interval for a seamless transition from a current channel to a new channel for the CBSD; and
    receive one or more time instances associated with the time interval.

16. The non-transitory computer-readable medium of claim 13, further comprising instructions which, when executed by the one or more processors, cause the one or more processors to:
    determine one or more physical cell identifiers (PCIs) of one or more cells associated with the CBSD and one or more neighboring CBSDs; and
    provide the one or more PCIs to the SAS.

17. The non-transitory computer-readable medium of claim 13, wherein the one or more parameters comprising at least one of a frequency range in one or more channels or a maximum transmit Effective Isotropic Radiated Power (EIRP); and further comprising instructions which, when executed by the one or more processors, cause the one or more processors to: determine resources for the one or more CBRS UEs based on the one or more parameters.

18. The non-transitory computer-readable medium of claim 13, wherein the one or more policies are received from at least one of a Digital Network Architecture Center (DNA-C) or a network controller.

* * * * *